US012572190B2

(12) United States Patent (10) Patent No.: US 12,572,190 B2
Zhang et al. (45) Date of Patent: Mar. 10, 2026

(54) ELECTRONIC DEVICE, DEVICE IDENTIFICATION METHOD, AND CHARGING SYSTEM

(71) Applicant: HONOR DEVICE CO., LTD., Shenzhen (CN)

(72) Inventors: Tingwei Zhang, Shenzhen (CN); Feng Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/559,926

(22) PCT Filed: Apr. 23, 2023

(86) PCT No.: PCT/CN2023/090096
§ 371 (c)(1),
(2) Date: Nov. 9, 2023

(87) PCT Pub. No.: WO2024/021709
PCT Pub. Date: Feb. 1, 2024

(65) Prior Publication Data
US 2025/0148069 A1      May 8, 2025

(30) Foreign Application Priority Data
Jul. 27, 2022    (CN) .......................... 202210892907.8

(51) Int. Cl.
G06F 1/26 (2006.01)
(52) U.S. Cl.
CPC .................................. G06F 1/266 (2013.01)
(58) Field of Classification Search
CPC ..................................................... G06F 1/266
See application file for complete search history.

(56) References Cited

U.S. PATENT DOCUMENTS

2017/0040812 A1    2/2017  Li et al.
2020/0167306 A1*  5/2020  Wu ...................... G06F 13/4022
(Continued)

FOREIGN PATENT DOCUMENTS

CN        103618356 B    10/2016
CN        106058983 A    10/2016
(Continued)

OTHER PUBLICATIONS

Guo et al., "A Fast Charging System based on Charging Current Dynamic Adjustment Method," 2018 IEEE International Symposium on Circuits and Systems (ISCAS), May 27, 2018, 5 pages.

*Primary Examiner* — Eric T Oberly
(74) *Attorney, Agent, or Firm* — Fish & Richardson P.C.

(57) ABSTRACT

This application provides an electronic device, a device identification method, and a charging system. The electronic device includes a processor, a controller, a charging protocol chip, an external interface, and a switch circuit. The processor, the charging protocol chip, and the external interface each include a data pin unit. The data pin unit of the processor, the data pin unit of the charging protocol chip, the data pin unit of the external interface, and the controller are separately electrically connected to the switch circuit. The controller is configured to control the switch circuit, so that the data pin unit of the external interface is connected to one of the data pin unit of the processor and the data pin unit of the charging protocol chip and is disconnected from the other of the data pin unit of the processor and the data pin unit of the charging protocol chip.

20 Claims, 16 Drawing Sheets

(56) References Cited

U.S. PATENT DOCUMENTS

| | | | |
|---|---|---|---|
| 2022/0393496 A1* | 12/2022 | Sun | H02J 7/00032 |
| 2023/0042872 A1* | 2/2023 | Sun | H02J 7/342 |
| 2023/0128935 A1* | 4/2023 | Kim | G06F 1/3215 |
| | | | 713/300 |
| 2023/0261477 A1 | 8/2023 | Peng et al. | |
| 2023/0305615 A1* | 9/2023 | Natarajan | G06F 13/4282 |
| 2023/0350839 A1* | 11/2023 | Han | G06F 13/4282 |

FOREIGN PATENT DOCUMENTS

| | | | |
|---|---|---|---|
| CN | 108093329 A | 5/2018 | |
| CN | 111201689 A | 5/2020 | |
| CN | 108964187 B | 10/2020 | |
| CN | 112448423 A | 3/2021 | |
| CN | 112737566 A | 4/2021 | |
| CN | 112787372 A | 5/2021 | |
| CN | 113054716 A | 6/2021 | |
| CN | 213399565 U | 6/2021 | |
| CN | 111201689 B | 9/2021 | |
| CN | 113659663 A | 11/2021 | |
| CN | 2022012644 A1 | 1/2022 | |
| CN | 114967894 A | 8/2022 | |
| WO | 2019113732 A1 | 6/2019 | |

* cited by examiner

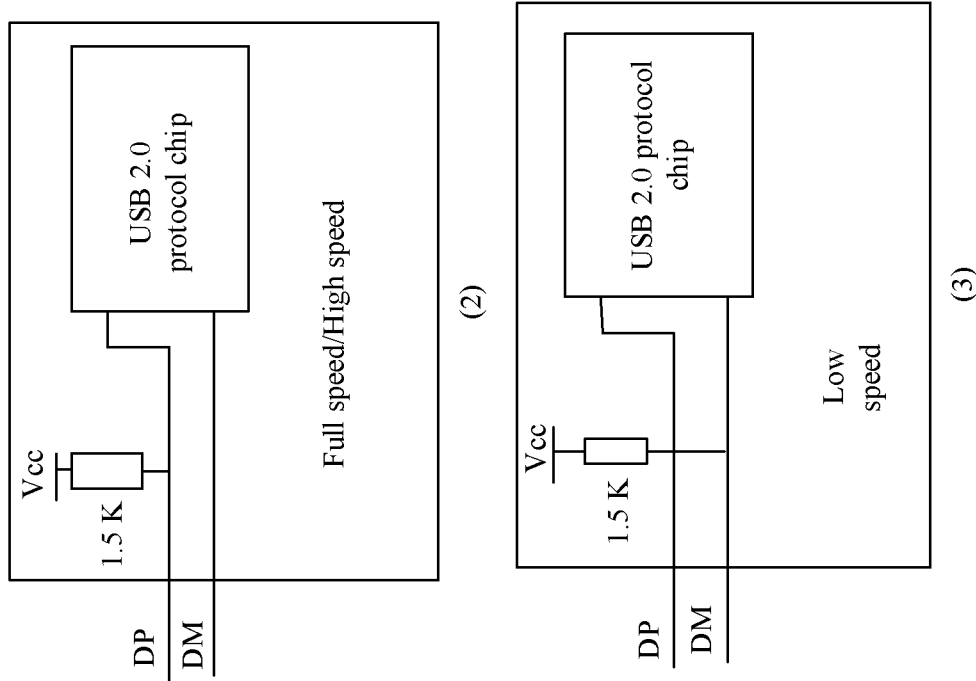
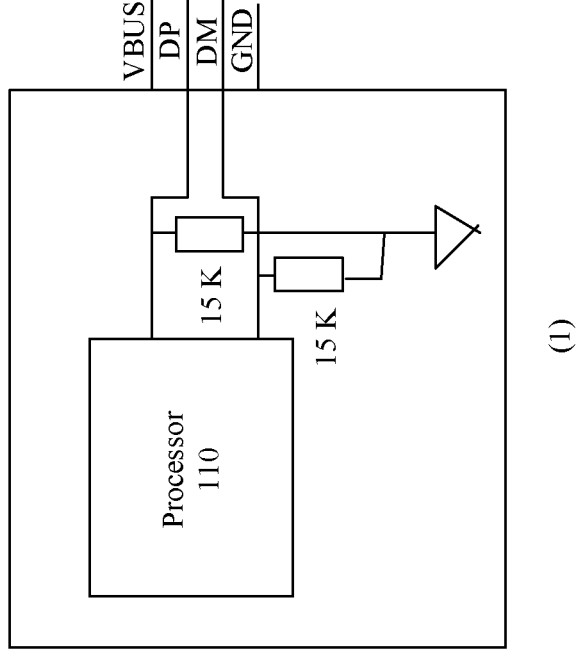
FIG. 3

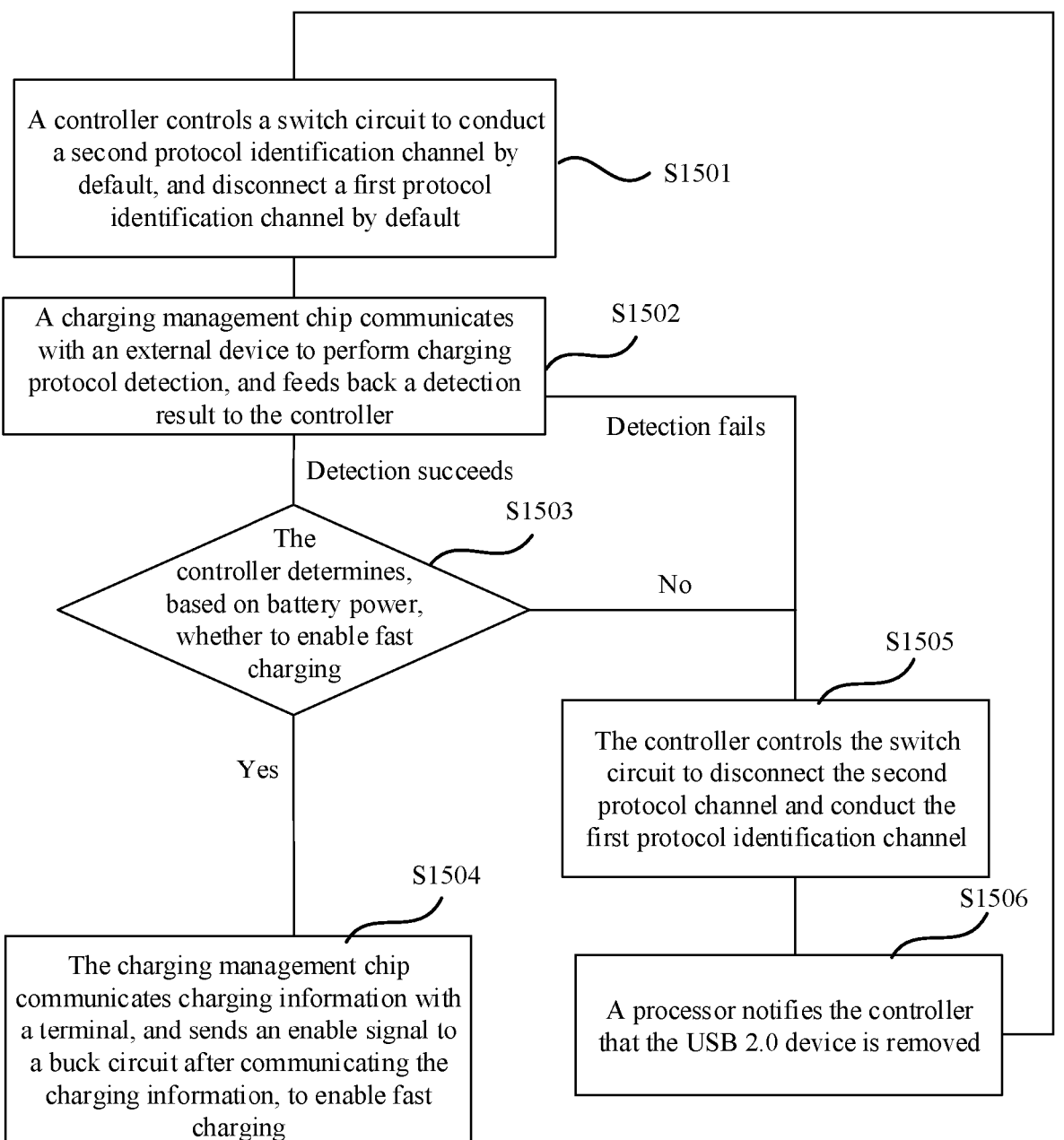

A controller controls a switch circuit to conduct a second protocol identification channel by default, and disconnect a first protocol identification channel by default          S1501

A charging management chip communicates with an external device to perform charging protocol detection, and feeds back a detection result to the controller          S1502

Detection fails

Detection succeeds

The controller determines, based on battery power, whether to enable fast charging          S1503

No

Yes

The controller controls the switch circuit to disconnect the second protocol channel and conduct the first protocol identification channel          S1505

S1504

The charging management chip communicates charging information with a terminal, and sends an enable signal to a buck circuit after communicating the charging information, to enable fast charging A processor notifies the controller that the USB 2.0 device is removed          S1506

FIG. 15

ELECTRONIC DEVICE, DEVICE IDENTIFICATION METHOD, AND CHARGING SYSTEM

CROSS-REFERENCE TO RELATED APPLICATIONS

This application is a National Stage of International Application No. PCT/CN2023/090096 filed on Apr. 23, 2023, which claims priority to Chinese Patent Application No. 202210892907.8 filed on Jul. 27, 2022, which are incorporated herein by reference in their entireties.

TECHNICAL FIELD

This application relates to the field of electronic technologies, and in particular, to an electronic device, a device identification method, and a charging system.

BACKGROUND

Currently, devices such as notebooks, mobile phones, and tablets have become common devices in people's daily life and working. These devices all need to be charged when battery power is about to be used up, to supplement power. Therefore, people need to carry charging cables and chargers of various devices, which brings many inconveniences.

Although a terminal such as a mobile phone or a tablet may be charged through a universal serial bus (universal serial bus, USB) interface of a notebook, currently, the notebook does not support a fast charging protocol used by a device such as the mobile phone or the tablet, and therefore, a charging speed is very low, and power cannot be quickly supplemented to the mobile phone, the tablet, or the like.

SUMMARY

To resolve the foregoing technical problem, this application provides an electronic device, a device identification method, and a charging system. In the electronic device, a charging protocol chip is added to provide a fast charging function externally, and an external interface of the electronic device is electrically connected to only one of a processor and the charging protocol chip at a same time, so that when an external device is identified, the charging protocol chip and the processor do not interfere with each other. Therefore, the electronic device can implement fast charging externally without affecting identification of a USB 2.0 device.

According to a first aspect, this application provides an electronic device. The electronic device includes a processor, a controller, a charging protocol chip, an external interface, and a switch circuit. The processor, the charging protocol chip, and the external interface each include a data pin unit. The data pin unit of the processor, the data pin unit of the charging protocol chip, the data pin unit of the external interface, and the controller are separately electrically connected to the switch circuit. The controller is configured to control the switch circuit, so that the data pin unit of the external interface is connected to one of the data pin unit of the processor and the data pin unit of the charging protocol chip and is disconnected from the other of the data pin unit of the processor and the data pin unit of the charging protocol chip. The data pin unit may include one data pin, or may include a plurality of data pins. A first protocol identification channel may be formed between the data pin unit of the external interface and the data pin unit of the processor, and the first protocol identification channel is, for example, a USB 2.0 protocol identification channel. A second protocol identification channel may be formed between the data pin unit of the external interface and the data pin unit of the charging protocol chip, and the second protocol identification channel is, for example, an SCP/FCP protocol identification channel. The controller controls the switch circuit, so that when one of the first protocol identification channel and the second protocol identification channel is conducted, the other is disconnected.

According to the electronic device in the first aspect, the charging protocol chip is added, so that a fast charging function can be provided to an external device. In addition, when the external device is electrically connected to the external interface, because only one of the processor and the charging protocol chip is electrically connected to the external interface, when identifying the external device or interacting with the external device, the charging protocol chip and the processor do not interfere with each other. Therefore, the electronic device can implement fast charging on the external device without affecting identification of a USB 2.0 device.

According to the first aspect or any implementation of the first aspect, the external interface is configured to electrically connect to an external device. The processor is configured to perform first protocol identification on the external device when the external interface is electrically connected to the external device and the data pin unit of the processor is connected to the pin unit of the external interface. The charging protocol chip is configured to perform second protocol identification on the external device when the external interface is electrically connected to the external device and the data pin unit of the charging protocol chip is connected to the pin unit of the external interface. The processor and the charging protocol chip are separately electrically connected to the controller, and are configured to send, to the controller, an indication indicating that the protocol identification succeeds or fails. The controller is configured to: after receiving an indication that is sent by the processor and that indicates that the first protocol identification succeeds, continue to control the switch circuit, so that the data pin unit of the external interface is connected to the data pin unit of the processor and is disconnected from the data pin unit of the charging protocol chip; and control the switch circuit after receiving an indication that is sent by the processor and that indicates that the first protocol identification fails, so that the data pin unit of the external interface is disconnected from the data pin unit of the processor and is connected to the data pin unit of the charging protocol chip. The controller is configured to: after receiving an indication that is sent by the charging protocol chip and that indicates that the second protocol identification succeeds, continue to control the switch circuit, so that the data pin unit of the external interface is connected to the data pin unit of the charging protocol chip and is disconnected from the data pin unit of the processor; and control the switch circuit after receiving an indication that is sent by the charging protocol chip and that indicates that the second protocol identification fails, so that the data pin unit of the external interface is disconnected from the data pin unit of the charging protocol chip and is connected to the data pin unit of the processor. In this way, the controller may control the switch circuit based on an indication indicating that the processor or the charging protocol chip succeeds or fails in the identification. When the processor or the charging protocol chip succeeds in the identification, the switch circuit is controlled to continue to conduct a corresponding protocol identification channel; and when the identification fails, the switch circuit is controlled to switch to another protocol identification channel, so that the electronic device can implement fast charging on the external device without affecting identification of a USB 2.0 device.

According to the first aspect or any implementation of the first aspect, the controller controls the switch circuit, so that the data pin unit of the external interface is connected to the data pin unit of the charging protocol chip and is disconnected from the data pin unit of the processor; and after receiving the indication that is sent by the charging protocol chip and that indicates that the second protocol identification fails, the controller controls the switch circuit, so that the data pin unit of the external interface is disconnected from the data pin unit of the charging protocol chip and is connected to the data pin unit of the processor. The controller controls the switch circuit to first connect the external interface and the charging protocol chip by default, to first perform the second protocol (for example, a charging protocol) identification on the external device. Then, after the second protocol identification fails, the first protocol identification is performed on the external device. In this way, because the second protocol identification is first performed on the external device, when a second protocol has a duration requirement for an identification process, the following case may be avoided: protocol identification fails or an error occurs in protocol identification because identification duration exceeds duration specified for the second protocol identification.

According to the first aspect or any implementation of the first aspect, the electronic device further includes a voltage conversion circuit and a battery, and the external interface further includes a power-supply pin. The battery is electrically connected to the power-supply pin of the external interface by using the voltage conversion circuit. The charging protocol chip is connected to the voltage conversion circuit, and is configured to send an enable signal to the voltage conversion circuit after the charging protocol chip succeeds in the protocol identification, so that the voltage conversion circuit provides a specified voltage to the power-supply pin of the external interface. In this way, the electronic device may provide a required charging voltage based on a requirement of a to-be-charged device, to implement fast charging on the external device.

According to the first aspect or any implementation of the first aspect, the controller is further configured to: after receiving the indication that is sent by the charging protocol chip and that indicates that the second protocol identification succeeds, obtain power information of the battery, and send, to the charging protocol chip based on the power information of the battery, an indication indicating to enable fast charging or not to enable fast charging. In this way, it may be determined, based on battery power of the electronic device, whether to perform fast charging on the external device, to avoid that fast charging cannot be performed or use of the electronic device is affected due to low power.

According to the first aspect or any implementation of the first aspect, when power of the battery is greater than a specified threshold, the controller sends an indication indicating to enable fast charging to the charging protocol chip; and when the power of the battery is less than or equal to the specified threshold, the controller sends an indication indicating not to enable fast charging to the charging protocol chip. In this way, it may be determined, based on battery power of the electronic device, whether to perform fast charging on the external device, to avoid that fast charging cannot be performed or use of the electronic device is affected due to low power.

According to the first aspect or any implementation of the first aspect, when the external device is a device supporting a first protocol, and after the external device is removed from the external interface, the processor is further configured to send, to the controller after the external device is removed, an indication indicating that the external device is removed; and the controller controls the switch circuit based on the indication indicating that the external device is removed, so that the data pin unit of the external interface is disconnected from the data pin unit of the processor and is connected to the data pin unit of the charging protocol chip. In this way, after the external device is removed, the controller controls the switch circuit to first connect the external interface and the charging protocol chip by default, to first perform the second protocol (for example, a charging protocol) identification on the external device, so that when a second protocol has a duration requirement for an identification process, the following case may be avoided: protocol identification fails or an error occurs in protocol identification because identification duration exceeds duration specified for the second protocol identification.

According to the first aspect or any implementation of the first aspect, the switch circuit includes a switch chip, and the data pin unit of the processor, the data pin unit of the charging protocol chip, the data pin unit of the external interface, and the controller are separately electrically connected to the switch chip. In this way, an electrical connection between the data pin units of the external interface, the processor, and the charging protocol chip can be controlled by using one switch chip, to ensure that the processor and the charging protocol chip do not interfere with each other in a process of identifying an external device.

According to the first aspect or any implementation of the first aspect, the switch circuit includes a first switch unit and a second switch unit. The data pin unit of the processor, the data pin unit of the external interface, and the controller are separately electrically connected to the first switch unit, and the controller is configured to control the first switch unit, so that the data pin unit of the external interface is connected to or disconnected from the data pin unit of the processor. The data pin unit of the charging protocol chip, the data pin unit of the external interface, and the controller are separately electrically connected to the second switch unit, and the controller is configured to control the second switch unit, so that the data pin unit of the external interface is connected to or disconnected from the data pin unit of the charging protocol chip. In this way, the first switch unit and the second switch unit are respectively used to control an electrical connection between the processor and the external interface and an electrical connection between the charging protocol chip and the external interface, to ensure that the processor and the charging protocol chip do not interfere with each other in a process of identifying an external device.

According to the first aspect or any implementation of the first aspect, the first switch unit and the second switch unit each include a switch chip. The first switch unit and the second switch unit each can implement a switch chip, and a proper chip may be selected based on a requirement to control the electrical connection between the external interface and each of the processor and the charging protocol chip.

According to the first aspect or any implementation of the first aspect, the data pin unit includes a first data pin and a second data pin. The switch circuit includes a first switch unit to a fourth switch unit. The first data pin of the processor, the first data pin of the external interface, and the controller are separately electrically connected to the first switch unit, and the controller is configured to control the first switch unit, so that the first data pin of the external interface is connected to or disconnected from the first data pin of the processor. The second data pin of the processor, the second data pin of the external interface, and the controller are separately electrically connected to the second switch unit, and the controller is configured to control the second switch unit, so that the second data pin of the external interface is connected to or disconnected from the second data pin of the processor. The first data pin of the charging protocol chip, the first data pin of the external interface, and the controller are separately electrically connected to the third switch unit, and the controller is configured to control the third switch unit, so that the first data pin of the external interface is connected to or disconnected from the first data pin of the charging protocol chip. The second data pin of the charging protocol chip, the second data pin of the external interface, and the controller are separately electrically connected to the fourth switch unit, and the controller is configured to control the fourth switch unit, so that the second data pin of the external interface is connected to or disconnected from the second data pin of the charging protocol chip. In this way, when the data pin unit includes two data pins, the electrical connection between the processor and the external interface and the electrical connection between the charging protocol chip and the external interface may be separately controlled by using four switch units, to ensure that the processor and the charging protocol chip do not interfere with each other in a process of identifying an external device.

According to the first aspect or any implementation of the first aspect, the first switch unit to the fourth switch unit each include a switch chip or a MOS transistor. In this way, a proper switch chip or MOS transistor may be selected based on a requirement to control the electrical connection between the external interface and each of the processor and the charging protocol chip.

According to the first aspect or any implementation of the first aspect, the first switch unit includes a PMOS transistor, the second switch unit includes a PMOS transistor, the third switch unit includes an NMOS transistor, and the fourth switch unit includes an NMOS transistor. In this way, the first switch unit and the second switch unit have a same type of transistor, the third switch unit and the fourth switch unit have a same type of transistor, and the first switch unit is opposite to the second switch unit. Therefore, the four switch units can be controlled by using one switch signal or a same switch signal. For example, a same high-level signal can be used to turn on the third and fourth switch units and turn off the first and second switch units, and a same low-level signal can be used to turn off the third and fourth switch units and turn on the first and second switch units, so that a control process is simplified.

According to the first aspect or any implementation of the first aspect, the first protocol includes a USB 2.0 protocol, and a second protocol includes an SCP/FCP fast charging protocol. In this way, the electronic device can implement SCP/FCP fast charging on an external device without affecting identification of a USB 2.0 device.

According to the first aspect or any implementation of the first aspect, the data pin unit includes a DP pin or a DM pin. In this way, when protocol communication is performed by using the DP pin and the DM pin, the electronic device can implement fast charging on an external device without affecting identification of a USB 2.0 device.

According to a second aspect, this application provides a device identification method, applied to the electronic device in the first aspect. The device identification method includes:

The controller controls the switch circuit, so that the data pin unit of the external interface is connected to one of the data pin unit of the processor and the data pin unit of the charging protocol chip and is disconnected from the other of the data pin unit of the processor and the data pin unit of the charging protocol chip.

One of the processor and the charging protocol chip identifies a type of an external device connected to the external interface, where the type of the external device includes, for example, an external device supporting a first protocol and an external device supporting a second protocol. For example, the external device includes a USB 2.0 device and a to-be-charged terminal.

After one of the processor and the charging protocol chip fails in the identification, the controller controls the switch circuit, so that the data pin unit of the external interface is disconnected from one of the data pin unit of the processor and the data pin unit of the charging protocol chip and is connected to the other of the data pin unit of the processor and the data pin unit of the charging protocol chip.

The other of the processor and the charging protocol chip identifies the type of the external device connected to the external interface.

According to the device identification method in the second aspect, when the external device is electrically connected to the external interface, because only one of the processor and the charging protocol chip is electrically connected to the external interface, when identifying the external device or interacting with the external device, the charging protocol chip and the processor do not interfere with each other. Therefore, the electronic device can implement fast charging on the external device without affecting identification of a USB 2.0 device.

According to the second aspect or any implementation of the second aspect, the controller controls the switch circuit, so that the data pin unit of the external interface is connected to the data pin unit of the charging protocol chip and is disconnected from the data pin unit of the processor. The charging protocol chip identifies the type of the external device. After the charging protocol chip fails in the identification, the controller controls the switch circuit, so that the data pin unit of the external interface is disconnected from one of data pin units of the charging protocol chip and is connected to the data pin unit of the processor. The processor identifies the type of the external device. In this way, because second protocol identification is first performed on the external device, when a second protocol has a duration requirement for an identification process, the following case may be avoided: protocol identification fails or an error occurs in protocol identification because identification duration exceeds duration specified for the second protocol identification.

According to the second aspect or any implementation of the second aspect, when the external device connected to the external interface is of a type corresponding to the processor, the device identification method further includes: After the external device is removed, the processor sends, to the controller, an indication indicating that the external device is removed; and after receiving the indication indicating that the external device is removed, the controller controls the switch circuit, so that the data pin unit of the external interface is connected to the data pin unit of the charging protocol chip and is disconnected from the data pin unit of the processor. In this way, after the external device is removed, the controller controls the switch circuit to first connect the external interface and the charging protocol chip by default, to first perform the second protocol (for example, a charging protocol) identification on the external device, so that when a second protocol has a duration requirement for an identification process, the following case may be avoided: protocol identification fails or an error occurs in protocol identification because identification duration exceeds duration specified for the second protocol identification.

According to a third aspect, this application provides a charging system, including the electronic device in the first aspect and a terminal. The terminal includes a charging interface and a battery. The charging interface is electrically connected to the external interface. The electronic device charges the battery in the terminal through the external interface and the charging interface. In this way, the terminal may be quickly charged by using the electronic device, thereby improving charging convenience.

According to a fourth aspect, this application provides a chip. The chip includes a processing circuit and a transceiver pin. The transceiver pin and the processing circuit communicate with each other through an internal connection channel. The processing circuit performs the method in the second aspect or any possible implementation of the second aspect, to control a receive pin to receive a signal, and to control a transmit pin to send a signal.

BRIEF DESCRIPTION OF DRAWINGS

FIG. 3 is an example schematic diagram of a principle of identifying a USB 2.0 device;

FIG. 15 is an example schematic flowchart of a device identification method according to an embodiment of this application.

DESCRIPTION OF EMBODIMENTS

The following clearly and completely describes the technical solutions in the embodiments of this application with reference to the accompanying drawings in the embodiments of this application. Clearly, the described embodiments are some rather than all of the embodiments of this application. All other embodiments obtained by persons of ordinary skill in the art based on the embodiments of this application without creative efforts shall fall within the protection scope of this application.

In this specification, the term "and/or" is merely used to describe an association relationship between associated objects, and indicates that three relationships may exist. For example, "A and/or B" may indicate the following three cases: Only A exists, both A and B exist, and only B exists.

The terms "first", "second", and the like in the specification and claims of the embodiments of this application are used to distinguish between different objects, and are not used to describe a specific sequence of the objects. For example, a first target object, a second target object, and the like are used to distinguish between different target objects, but are not used to describe a specific sequence of the target objects.

In the embodiments of this application, words such as "an example" or "for example" are used to represent giving an example, an illustration, or a description. Any embodiment or design solution described as "an example" or "for example" in the embodiments of this application should not be construed as being more preferred or advantageous than other embodiments or design solutions. Exactly, use of the words such as "an example" or "for example" is intended to present a related concept in a specific manner.

In the description of the embodiments of this application, unless otherwise stated, "a plurality of" means two or more. For example, "a plurality of processing units" means two or more processing units, and "a plurality of systems" means two or more systems.

Figure 1:
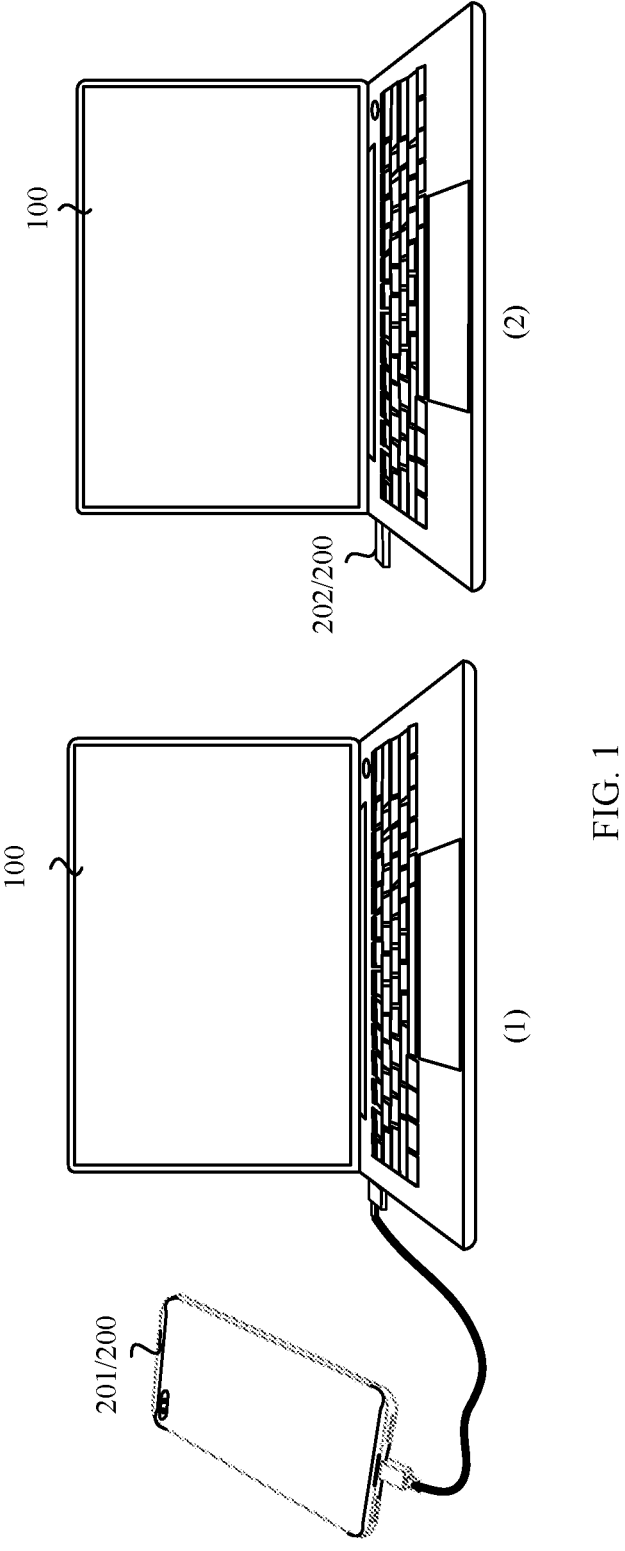
FIG. 1 is an example first schematic diagram of an application scenario.

FIG. 1 is an example schematic diagram of an application scenario. Referring to FIG. 1, for example, an electronic device 100 may be a device such as a notebook computer, and an external interface such as a Type-C universal serial bus (universal serial bus, USB) interface is configured on the electronic device 100. The electronic device 100 may be connected to an external device 200 through the external interface. Referring to (1) in FIG. 1, for example, the external device 200 may be a to-be-charged terminal such as a mobile phone or a tablet. Referring to (2) in FIG. 1, for example, the external device 200 may alternatively be a USB 2.0 device such as a USB flash drive or a removable hard disk. The USB 2.0 device is a storage device or an electronic device that supports a USB 2.0 protocol. In the application scenario shown in FIG. 1, the electronic device 100 may quickly charge a to-be-charged terminal 201 such as a mobile phone or a tablet through the external interface, or may communicate with or exchange data with an electronic device, such as a USB flash drive or a removable hard disk, that is used as a hard disk, or another type of USB 2.0 device 202, to implement functions such as communication and data reading or storage.

In the application scenario shown in FIG. 1, the electronic device 100 may provide a fast charging function for the to-be-charged terminal 201 such as a mobile phone or a tablet. In this application, fast charging means performing charging in a charging mode with charging power greater than 10 W, for example, the charging power may be 18 W, 22.5 W, 40 W, 60 W, or 100 W. In an implementation, the electronic device 100 supports a super charge protocol/fast charge protocol (Super Charge Protocol, SCP)/Fast Charger Protocol, FCP). Through the external interface, the electronic device 100 may perform fast charging on the to-be-charged terminal 201 that supports the SCP/FCP protocol.

Figure 2:
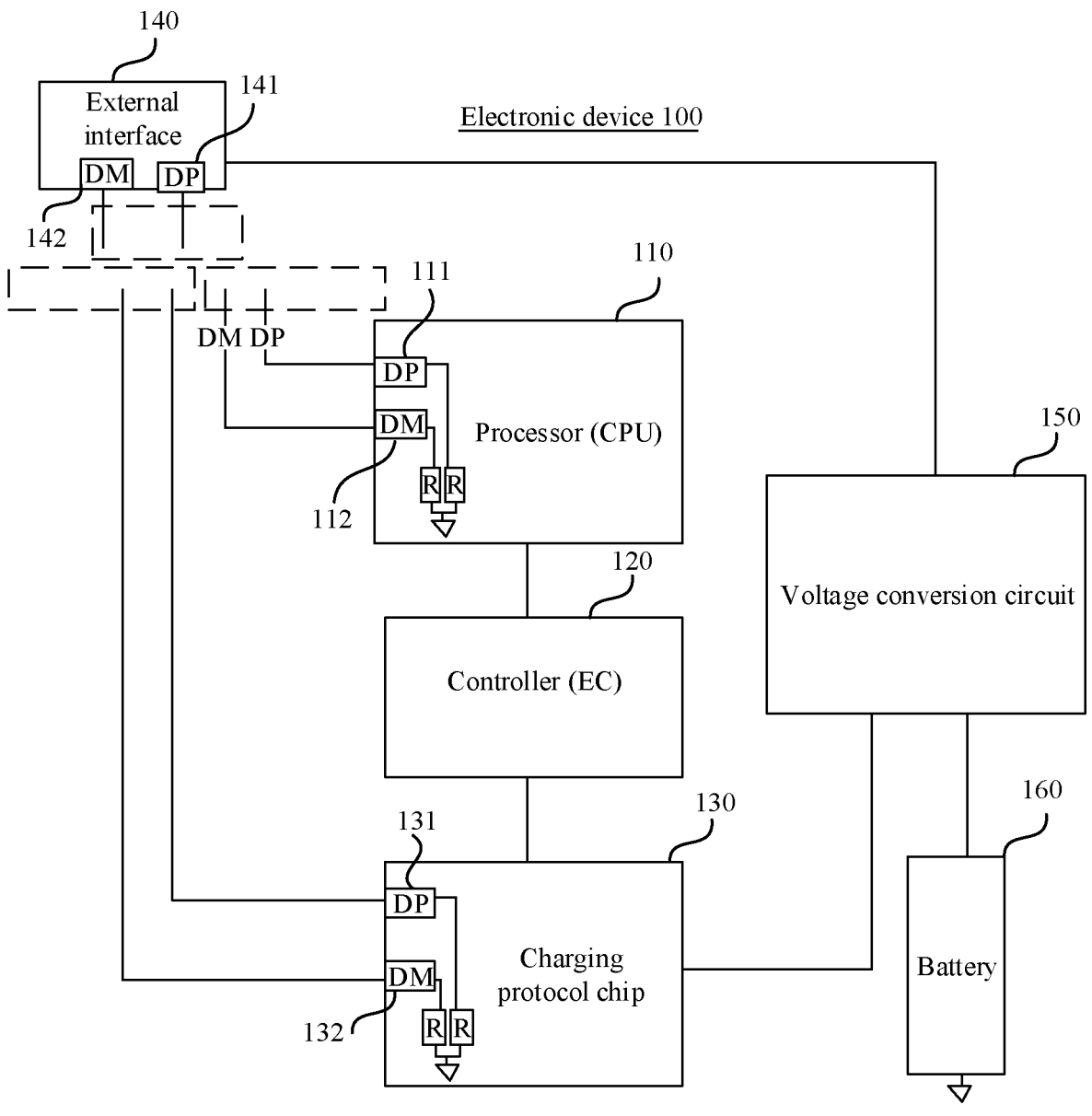
FIG. 2 is an example schematic diagram of a structure of an electronic device applied to the application scenario shown in FIG. 1.

FIG. 2 is an example schematic diagram of a structure of the electronic device 100 applied to the application scenario shown in FIG. 1. Referring to FIG. 2, the electronic device 100 includes a processor 110, a controller 120, a charging protocol chip 130, an external interface 140, a voltage conversion circuit 150, and a battery 160. The external interface 140 may be, for example, a type-C USB interface. In the electronic device 100 shown in FIG. 2, the processor 110 includes a first data pin 111 (for example, DP or D+) and a second data pin (for example, DM or D−). The charging protocol chip 130 includes a first data pin 131 (for example, DP or D+) and a second data pin 132 (for example, DM or D−). The external interface 140 includes a first data pin 141 (for example, DP or D+) and a second data pin 142 (for example, DM or D−). In an aspect, the first data pin 141 and the second data pin 142 of the external interface 140 are respectively connected to the first data pin 111 and the second data pin 112 of the processor 110 to form a first protocol identification channel. The first protocol identification channel is, for example, a USB 2.0 device protocol identification channel. In another aspect, the first data pin 141 and the second data pin 142 of the external interface 140 are alternatively respectively connected to the first data pin 131 and the second data pin 132 of the charging protocol chip 130 to form a second protocol identification channel. The second protocol identification channel is, for example, a fast charging protocol identification channel.

Based on the USB 2.0 protocol, the first data pin 111 and the second data pin 112 of the processor 110 are separately grounded by using, for example, a pull-down resistor R of 15 K ohms. Based on the SCP/FCP protocol, the first data pin 131 and the second data pin 132 of the charging protocol chip 130 are separately grounded by using, for example, a pull-down resistor R of 15K ohms. After the external device 200 accesses the external interface 140, in both the USB 2.0 protocol and the SCP/FCP protocol of the electronic device 100, device identification is performed by using a configured level of a pull-down resistor in the electronic device 100.

Specifically, for example, the processor 110 detects levels of the first data pin 111 and the second data pin 112 of the processor 110 to determine whether a device that accesses the external interface 140 is a USB 2.0 device. The charging protocol chip 130 detects levels of the first data pin 131 and the second data pin 132 of the charging protocol chip 130 to determine whether a device that accesses the external interface 140 is a terminal device that supports the SCP/FCP protocol.

FIG. 3 is an example schematic diagram of a principle of identifying a USB 2.0 device. Referring to (1) in FIG. 3, data pins DP and DM of the processor 110 are separately grounded by using a pull-down resistor. Referring to (2) in FIG. 3, a USB high-speed/full-speed device includes a USB 2.0 protocol chip and data pins DP and DM, and the DP pin is connected to a power supply Vcc by using a pull-up resistor. Referring to (3) in FIG. 3, a USB low-speed device includes a USB 2.0 protocol chip and data pins DP and DM, and the DM pin is connected to a power supply Vcc by using a pull-up resistor. A resistance value of the pull-up resistor is, for example, 1.5 KΩ.

When the electronic device 100 is not connected to the external device 200, pull-down resistors connected to the DP pin and the DM pin make voltages of the two data lines to be relative to the ground (refer to (1) in FIG. 3). After a full-speed/high-speed device is connected to the electronic device 100, the pull-down resistor connected to the data pin DP of the processor 110 and a pull-up resistor connected to a data pin DP of the external device 200 constitute a voltage divider. Because a resistance value of the pull-down resistor is 15 KΩ and a resistance value of the pull-up resistor is 1.5 kΩ a direct-current high-level voltage whose value is (Vcc*15/(15+1.5)) appears on the data pin DP of the processor 110. When the processor 110 detects that the voltage of the DP pin approaches a high level and the DM pin remains grounded, it can be determined that a full-speed/high-speed USB 2.0 device is accessed. Correspondingly, when the processor 110 detects that a voltage of the DM pin approaches a high level and the DP pin remains grounded, it can be determined that a low-speed USB 2.0 device is accessed.

It should be understood that the foregoing USB 2.0 device identification process/method is merely an example. In the embodiments of this application, identification may be performed in another manner based on the foregoing principle or a similar principle.

In an SCP protocol detection process, whether a charging interface is a dedicated charging interface (a DCP interface) is first detected through BC1.2. The following describes an example of an SCP protocol detection principle with reference to FIG. 4-FIG. 6.

Figure 4:
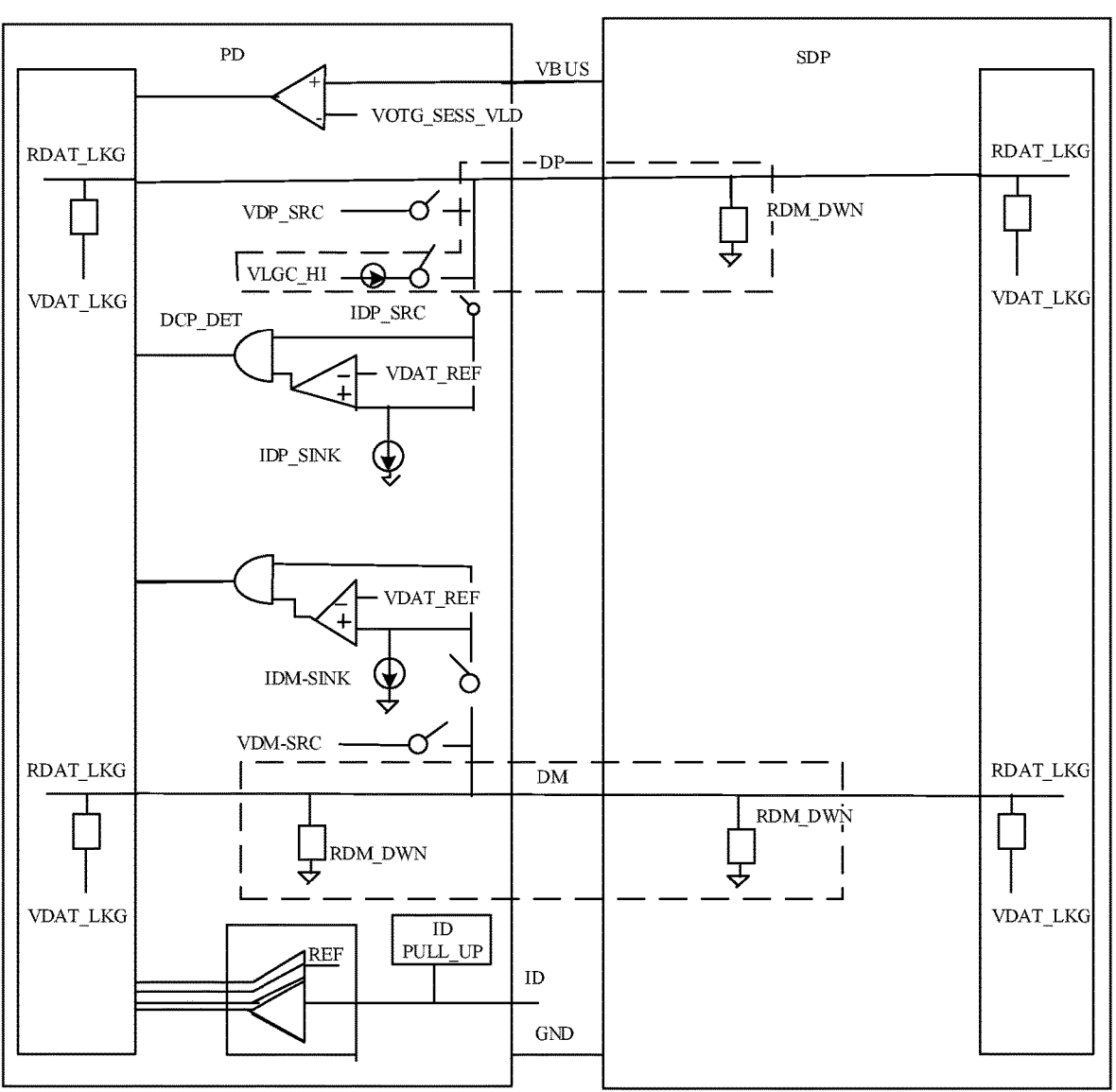
FIG. 4-FIG. 6 are example schematic diagrams of SCP protocol identification principles.
Figure 5:
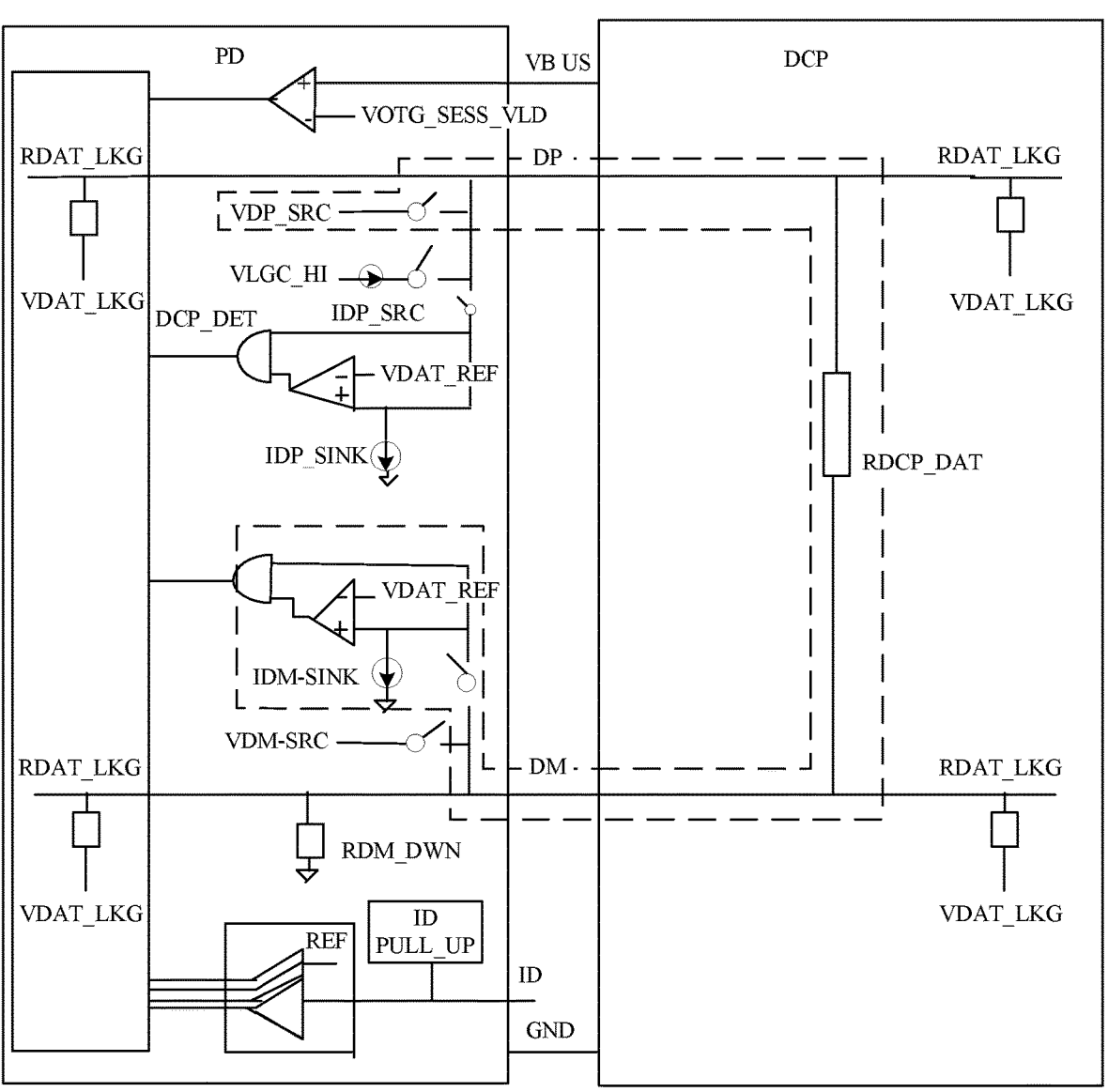
Figure 6:
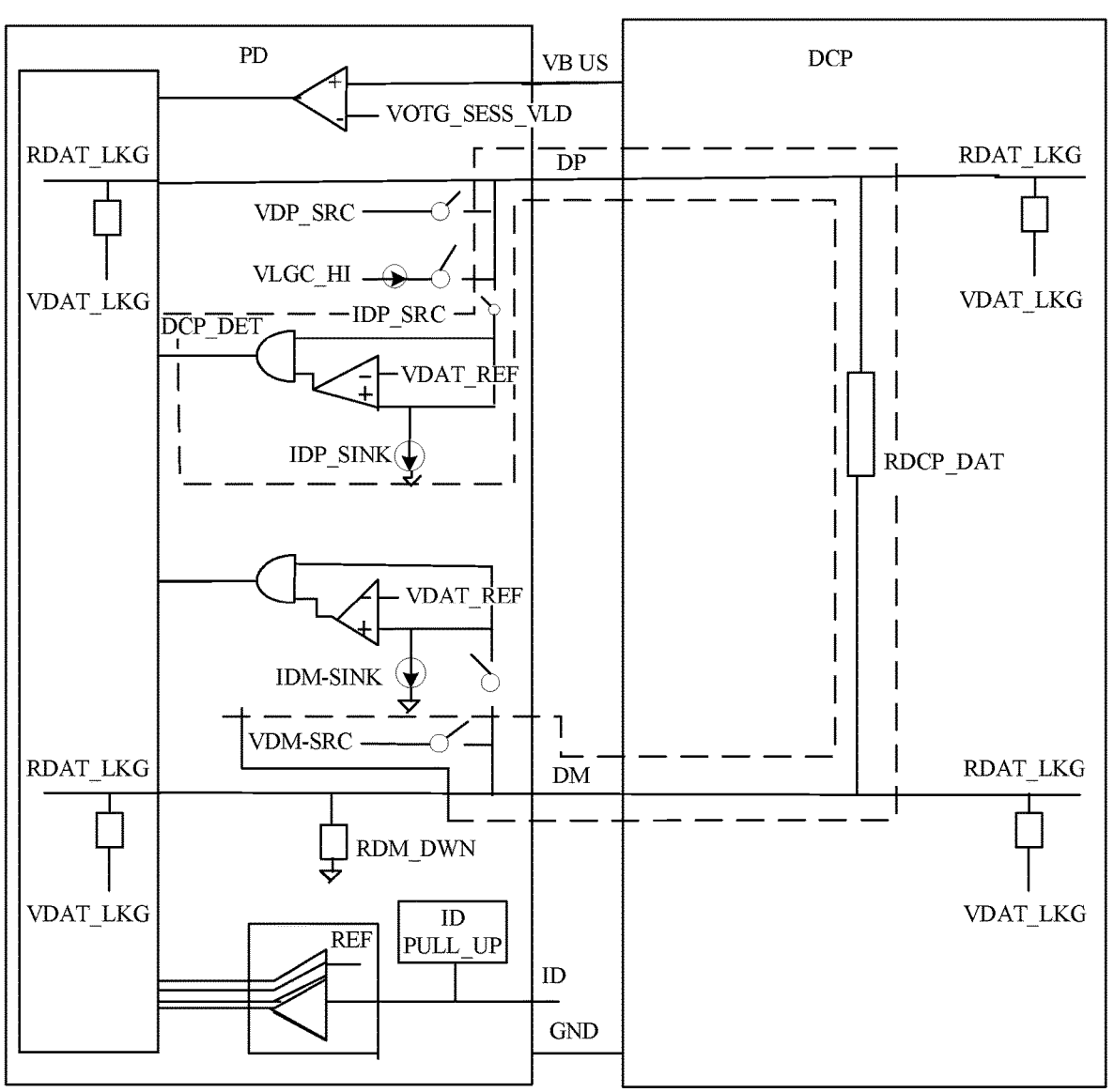

FIG. 4-FIG. 6 are example schematic diagrams of SCP protocol identification principles. The charging protocol BC1.2 (Battery Charging Specification 1.2) defines three interface types:

Standard downstream port (SDP, Standard Downstream Port): This type of interface supports a USB protocol. In a case of suspending, a maximum current is 2.5 mA; and in a case of a connected but non-suspended apparatus, a maximum current is 100 mA. DP and DM pins of the interface each have a resistor of 15 kΩ connected to the GND.

Dedicated charging port (DCP, Dedicated Charging Port): This type of port does not support any data transmission, but can provide a current greater than 1.5 A. This type of interface supports a wall charger and an in-vehicle charger that have a high charging capability, which do not need to be enumerated.

Charging downstream port (CDP, Charging Downstream Port): This type of interface supports both high-current charging (up to 1.5 A) and data transmission fully compatible with USB 2.0. DP and DM pins of the interface each have a 15 kΩ pull-down resistor necessary for communication, and also have an internal circuit for switching in a charger detection phase. The internal circuit allows a device to distinguish the CDP from other types of ports.

FIG. 4 shows a working mode (a dashed-line area in FIG. 4) used when data detection is performed after a USB interface of a terminal PD (portable device, for example, a to-be-charged terminal 201) is connected to an external interface. For example, a data detection process is as follows: After VBUS is valid, the terminal PD enables a current source IDP_SRC of a DP pin and a pull-down resistor of a DM pin. Then, the terminal PD detects the DP pin, where detection duration lasts TDCD_DBNC (Data contact detect debounce min=10 ms), and further disables the current source IDP_SRC of the DP pin and the pull-down resistor of the DM pin. In this process, if the terminal PD is not connected to an external interface (for example, the external interface 140 of the electronic device 100), the DP pin of the terminal PD remains at a high level. A minimum value of the current source IDP_SRC (7 µA) is required to be capable of ensuring that the DP pin remains at a level VLGC_HI (for example, 4.0~3.6 V) in a worst leakage current case (RDAT_LKG and VDAT_LKG). When the terminal is connected to an SDP interface, the DP pin is pulled down by a pull-down resistor RDP_DWN of the SDP interface. A maximum value of the current source IDP_SRC (13 µA) is required to be capable of ensuring that the DP pin remains at VLGC_LOW (Logic Low 0~0.8 V) in a worst leakage current case (RDAT_LKG, VDAT_LKG, and RDP_DWN). Therefore, after VBUS is valid, the current source IDP_SRC of the DP pin and the pull-down resistor of the DM pin are enabled, and a level of the DP pin can be detected to determine whether the external interface connected to the terminal PD supports a data protocol.

FIG. 5 shows a working mode (a dashed-line area in FIG. 5) used when main detection is performed after a USB interface of a terminal PD is connected to a DCP interface. For example, a main detection process is as follows: The terminal device PD enables a voltage source VDP_SRC (for example, 0.5~0.7V) of a DP pin and a current source IDM_SINK (for example, 25~175 µA) of a DM pin. The DP pin and the DM pin are short-circuited through a short-circuit resistor RDCP_DAT (Dedicated Charging Port resistance across D+/−max=200Ω) in the DCP interface. The terminal PD detects whether a voltage of the DM reaches VDP_SRC. The terminal PD compares the voltage of the DM with VDAT_REF (for example, 0.25~0.4 v) in a voltage comparator of the DM pin. If the voltage of the DM pin is greater than VDAT_REF, it can be determined that the terminal PD is connected to a charging interface, and then secondary detection is performed to determine whether the terminal PD is connected to a DCP interface or a CDP interface.

FIG. 6 shows a working mode (a dashed-line area in FIG. 6) used when secondary detection is performed after a USB interface of a terminal PD is connected to a DCP interface. For example, a secondary detection process is as follows: The terminal PD enables a voltage source VDM_SRC on a DM pin, enables a current source IDP_SINK, and then compares a voltage of a DP pin and a voltage of VDAT_REF. Because the DP pin and the DM pin are short-circuited through a short-circuit resistor RDCP_DAT in the DCP interface, a voltage of the voltage source VDM_SRC makes VDAT_REF<DP<VDM_SRC. Therefore, when the terminal PD detects that VDAT_REF<the voltage of the DP pin, it can be determined that the terminal is connected to the DCP interface.

In conclusion, it can be learned that in a process of USB 2.0 device protocol identification and SCP protocol identification, both a level of the first data pin and a level of the second data pin of the external interface 140 change. In the electronic device shown in FIG. 2, the first data pin 141 and the second data pin 142 of the external interface 140 are directly connected to the first data pin and the second data pin of each of the processor 110 and the charging protocol chip 130 (that is, both the first protocol identification channel and the second protocol identification channel are in a conductive state), and a same pull-down resistor is used. As a result, a pull-down resistor of one party affects protocol identification of the other party. For example, if an external device that accesses the external interface 140 is a to-be-charged terminal 201 such as a mobile phone, the processor 110 may also detect a change in levels of the first data pin and the second data pin of the processor. As a result, the external device is identified as a USB 2.0 device, or identification fails due to interference caused to charging protocol identification of the external device. Consequently, the electronic device 100 cannot correctly identify a USB 2.0 device, and cannot quickly charge a to-be-charged terminal such as a mobile phone.

Based on this, the embodiments of this application provide an electronic device, a device identification method, and a charging system. The charging system includes the electronic device and a terminal, and the electronic device can charge the terminal. A charging protocol chip is added to the electronic device to provide a fast charging function for the terminal, and a switch circuit is added to control conduction and disconnection of a USB 2.0 device protocol identification channel and a fast charging protocol identification channel, so that only one of the USB 2.0 device protocol identification channel and the fast charging protocol identification channel is conducted at a same time, to avoid mutual interference between the two protocol identification channels. In this way, an external interface can perform an SCP fast charging function without affecting identification of a USB 2.0 device. The electronic device may be a device configured with an external interface, for example, a notebook computer, an all-in-one computer, or a desktop computer. The terminal may be a to-be-charged terminal such as a mobile phone, a notebook computer, a tablet computer, a personal digital assistant (personal digital assistant, PDA for short), an in-vehicle computer, a television, an intelligent wearable device (for example, a smartwatch), a media player, or a smart home device. A specific form of the terminal is not specifically limited in the embodiments of this application. For ease of description, an example in which the electronic device is a notebook computer, and the terminal is a mobile phone is used for description in all the embodiments of this application.

It should be understood that, in the foregoing description, the SCP/FCP protocol is used as an example for description. Actually, the problem mentioned above exists when any chip that performs charging protocol communication by using a first data pin and a second data pin implements USB 2.0 support and fast charging support at a same external interface. The electronic device and the device identification method provided in the embodiments of this application are also applicable in this case. The following also uses the SCP/FCP protocol as an example for description.

It should be further understood that all the foregoing examples are described by using an example in which an external interface is a type-C USB interface and using a DP pin and a DM pin of the type-C USB interface as an example. However, this constitutes no limitation on this application, provided that any interface that implements a data communication function and a protocol identification function by using a pin in the interface falls within the protection scope of the embodiments of this application. The following also uses the type-C USB interface as an example for description.

Figure 7:
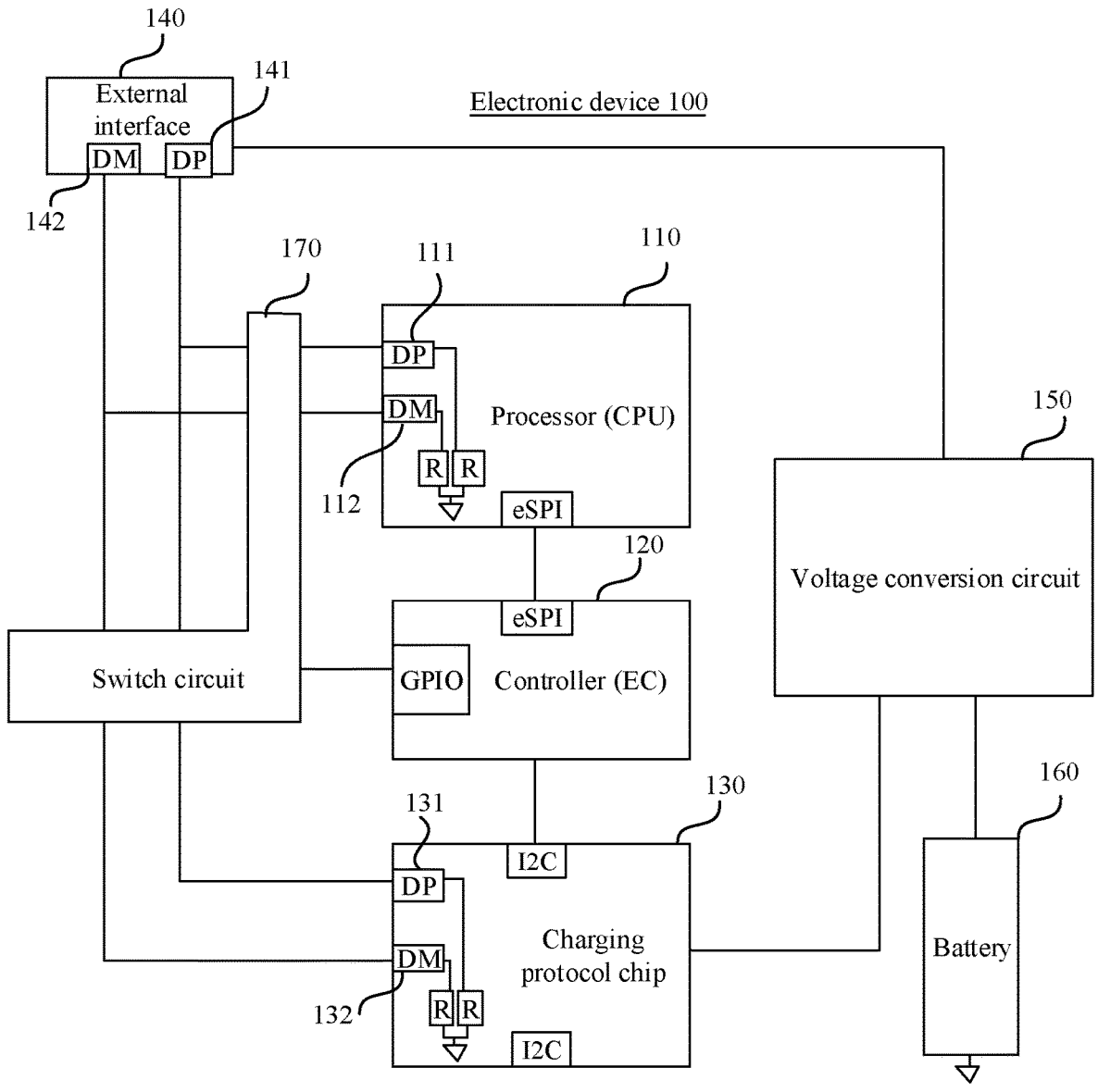
FIG. 7 is an example schematic diagram of a structure of an electronic device according to an embodiment of this application.

FIG. 7 is an example schematic diagram of a structure of an electronic device according to an embodiment of this application. Referring to FIG. 7, the electronic device 100 includes a processor 110, a controller 120, a charging protocol chip 130, an external interface 140, a voltage conversion circuit 150, a battery 160, and a switch circuit 170.

It should be understood that, the electronic device 100 may further include one or more of modules such as a power management module, an antenna, a wireless communication module, a mouse, an indicator, a keyboard, a camera, a display, an audio module, a speaker, a sound box interface, and a microphone, or may further include another module. This is not specifically limited herein.

The processor 110 may include one or more processing units. For example, the processor 110 may include an application processor, a modem processor, a graphics processing unit GPU, an ISP, a memory, a video codec, a DSP, a baseband processor, and/or an NPU. Different processing units may be independent components or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency. In some embodiments, the processor 110 may include one or more interfaces. The interface may include an inter-integrated circuit I2C interface, an inter-integrated circuit sound I2S interface, an eSPI interface, a PCM interface, a UART interface, an MIPI, a GPIO interface, a USB interface, and/or the like.

In this embodiment of this application, the processor 110 includes a first data pin 111 and a second data pin 112. The processor 110 is connected to the external interface 140 by using the first data pin 111 and the second data pin 112, to exchange data with or communicate with an external device. For example, based on a USB 2.0 protocol, the first data pin 111 and the second data pin 112 of the processor 110 are separately grounded by using, for example, a pull-down resistor R of 15 K ohms.

The controller 120 is, for example, an embedded controller EC, and is configured to implement functions such as keyboard control, a touchpad, power management, and fan control. The controller 120 may include independently running software, which is stored in a non-volatile medium of the controller 120. In some embodiments, the controller 120 may include one or more interfaces. The interface may include a general-purpose input/output (GPIO) interface, an eSPI (Enhanced Serial Peripheral, enhanced serial peripheral) interface, an inter-integrated circuit I2C interface, and the like. The controller 120 may be connected to and communicate with the processor 110 through, for example, the eSPI interface and an eSPI bus. The controller 120 may be further connected to the switch circuit 170 through, for example, the GPIO interface, to output a control signal to the switch circuit 170 to control the switch circuit 170. The controller 120 may be further connected to the charging protocol chip 130 through, for example, the inter-integrated circuit I2C interface, to communicate with the charging protocol chip 130.

The charging protocol chip 130 is, for example, a fast charging protocol chip that supports an SCP protocol, and is configured to perform fast charging protocol identification and charging communication. The charging protocol chip 130 includes a first data pin 131 and a second data pin 132. The charging protocol chip 130 is connected to the external interface 140 by using the first data pin 131 and the second data pin 132, to quickly charge an external device. For example, based on an SCP/FCP protocol, the first data pin 131 and the second data pin 132 of the charging protocol chip 130 are separately grounded by using, for example, a pull-down resistor R of 15 K ohms.

The charging protocol chip 130 may include one or more interfaces. The interface may include an inter-integrated circuit I2C interface and the like. The charging protocol chip 130 is connected to the controller 120 through, for example, the I2C interface and an I2C bus. The charging protocol chip 130 may send, to the controller 120, an indication or a signal that indicates that fast charging protocol identification succeeds or fails. The charging protocol chip 130 is further connected to the voltage conversion circuit 150, and is configured to send an enable signal to the voltage conversion circuit 150 after fast charging protocol identification succeeds, so that the voltage conversion circuit 150 outputs, to an external port, a charging voltage required by a terminal.

The external interface 140 may be, for example, a type-C USB interface. The external interface 140 includes a first data pin 141 and a second data pin 142. For example, the external interface 140 further includes a power-supply pin VBUS and a communication pin. In an aspect, the first data pin 141 and the second data pin 142 of the external interface 140 are respectively connected to the first data pin 111 and the second data pin 112 of the processor 110 to form a first protocol identification channel (that is, a USB 2.0 device protocol identification channel). In another aspect, the first data pin 141 and the second data pin 142 of the external interface 140 are alternatively respectively connected to the first data pin 131 and the second data pin 132 of the charging protocol chip 130 to form a second protocol identification channel (that is, a fast charging protocol identification channel).

The battery 160 supplies power to the external interface 140 by using the voltage conversion circuit 150, to supply power to or charge an external device. The battery 160 further supplies power to the processor 110, the controller 120, the charging protocol chip 130, and the like.

The switch circuit 170 is disposed between the first data pin 141 and the second data pin 142 of the external interface 140 and the first data pin and the second data pin of each of the processor 110 and the charging protocol chip 130, and is connected to the controller 120. Under control of the controller 120, the switch circuit 170 enables only one of the first protocol identification channel and the second protocol identification channel to be conducted at a same time, to avoid mutual interference between the two protocol identification channels. In this embodiment of this application, under control of the controller 120, the switch circuit 170 considers by default that the second protocol identification channel is conducted, and after fast charging protocol identification fails, disconnects the second protocol identification channel, and conducts the first protocol identification channel. Subsequently, USB 2.0 device identification is performed. In this way, under action of the switch circuit 170 and the controller 120, after an external device accesses the external interface 140, the electronic device 100 may first perform charging protocol identification and then perform USB 2.0 device identification. This not only enables the external interface 140 to support both a USB 2.0 device and a fast charging function, but also avoids interference between identification of a USB 2.0 device and identification of a to-be-charged terminal, thereby improving accuracy and a speed of identifying an external device. In other words, when the electronic device 100 is used, a terminal that supports the SCP protocol or the like can be quickly charged through the external interface without affecting identification of a USB 2.0 device.

The following describes in detail a process/method for identifying an external device by the electronic device 100.

Figure 8:
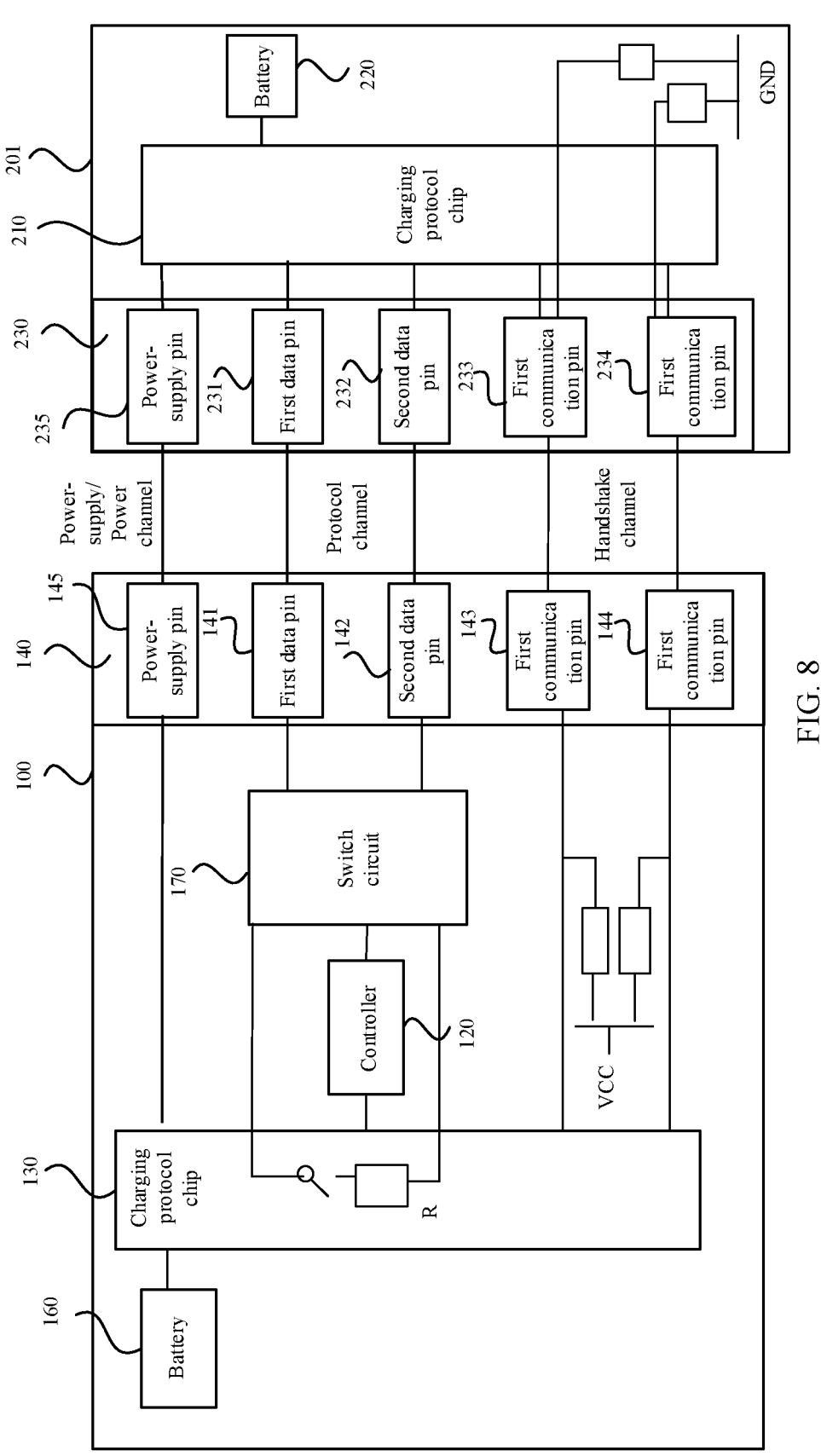
FIG. 8 is an example schematic diagram of a connection between an electronic device and a to-be-charged terminal according to an embodiment of this application.

FIG. 8 is an example schematic diagram of a connection between an electronic device and a to-be-charged terminal according to an embodiment of this application. Referring to FIG. 8, the external interface 140 includes a first data pin 141 (for example, DP), a second data pin 142 (for example, DM), a first communication pin 143 (for example, CC1), a second communication pin 144 (for example, CC2), and a power-supply pin 145 (for example, a VBUS pin). A switch circuit used to make the first data pin 141 and the second data pin 142 short-circuited is disposed in the charging protocol chip 130. The first communication pin 143 and the second communication pin 144 are connected to a power supply VCC (for example, 5 V) by using a pull-up resistor. A to-be-charged terminal 201 includes a charging protocol chip 210, a battery 220, and a charging interface 230. The charging interface 230 includes a first data pin 231 (for example, DP), a second data pin 232 (for example, DM), a first communication pin 233 (for example, CC1), a second communication pin 234 (for example, CC2), and a power-supply pin 235 (for example, a VBUS pin). The first communication pin 233 and the second communication pin 234 are grounded by using a pull-down resistor.

The controller 120 controls the switch circuit 170 to enable, by default, a second protocol channel between the charging protocol chip 130 and the first data pin 141 (for example, the DP) and the second data pin 142. After the to-be-charged terminal 201 accesses the electronic device 100, that is, after the charging interface 230 of the to-be-charged terminal 201 is connected to the external interface 140 of the electronic device 100, the power-supply pin 145 of the electronic device 100 is connected to the power-supply pin 235 of the to-be-charged terminal 201 to form a power-supply channel or a charging channel. The electronic device 100 may supply power to the to-be-charged terminal 201 through the channel. The first data pin 141 and the second data pin 142 of the electronic device 100 are respectively connected to the first data pin 231 and the second data pin 232 of the to-be-charged terminal 201 to form a protocol channel. The electronic device 100 performs protocol communication with the to-be-charged terminal 201 through protocol channel. The first communication pin 143 and the second communication pin 144 of the electronic device 100 are respectively connected to the first communication pin 233 and the second communication pin 234 of the to-be-charged terminal 201 to form a handshake channel. The electronic device 100 completes a handshake with the to-be-charged terminal 201 through the handshake protocol channel.

For example, in this embodiment of this application, the charging protocol chip 130 and the charging protocol chip 210 use, for example, an SCP protocol. After the to-be-charged terminal 201 accesses the electronic device 100, the electronic device 100 completes a handshake with the to-be-charged terminal 201 (that is, the charging protocol chip 130 completes a handshake with the charging protocol chip 210) through the handshake channel, and then provides the power-supply pin/power-supply channel with, for example, a Vbus voltage of 5 V. A process of a handshake between the electronic device 100 and the to-be-charged terminal 201 may be completed by using various proper handshake protocols. For example, a pull-up resistor is connected to each of the first communication pin 143 and the second communication pin 144 of the electronic device 100, and a pull-down resistor is connected to each of the first communication pin 233 and the second communication pin 234 of the to-be-charged terminal 201. Before the electronic device 100 is connected to the to-be-charged terminal 201, the power-supply pin 145 of the electronic device 100 has no voltage output. After the electronic device 100 is connected to the to-be-charged terminal 201, the first communication pin 143 and the second communication pin 144 of the electronic device 100 are respectively connected to the first communication pin 233 and the second communication pin 234 of the to-be-charged terminal 201 to form a voltage divider. The charging protocol chip 130 detects levels of the first communication pin 143 and the second communication pin 144 to detect the pull-down resistors of the first communication pin 233 and the second communication pin 234 of the to-be-charged terminal 201, to determine whether the to-be-charged terminal 201 is connected to the external interface 140. Then, the electronic device 100 turns off a switch (not shown in FIG. 8) of the power-supply pin 145, and outputs a Vbus power supply of, such as 5 V, to the to-be-charged terminal 201.

After the electronic device 100 completes a handshake with the to-be-charged terminal 201 through the handshake channel, the charging protocol chip 130 turns off the switch circuit used to make the first data pin 141 and the second data pin 142 short-circuited, so that the first data pin 141 and the second data pin 142 are short-circuited. The to-be-charged terminal 201 identifies, based on a BC1.2 protocol (Battery Charging v1.2), whether the electronic device 100 is a DCP (Dedicated Charging Port, dedicated charging port) device (an SCP fast charging protocol needs to first identify, by using the BC1.2 protocol, whether the electronic device 100 is a DCP device).

For example, an identification process is as follows: After being powered on the power-supply pin 235, the to-be-charged terminal 201 first performs data connection detection. For a data connection detection process, refer to the foregoing description provided with reference to FIG. 4. Details are not described herein again. If no detection data protocol is supported within specified duration (for example, 300~900 ms), the to-be-charged terminal 201 performs DCP detection.

For a DCP detection process, refer to the foregoing description provided with reference to FIG. 5 and FIG. 6. For example, the detection process may be as follows: First, the charging protocol chip 210 enables a voltage source VDP_SRC (for example, 0.5~0.7 v, which is not shown in FIG. 8, and for a setting manner, refer to FIG. 5 and FIG. 6) of the first data pin 231 and a current source IDM_SINK (for example, 25~175 μA, which is not shown in FIG. 8, and for a setting manner, refer to FIG. 5 and FIG. 6) of the second data pin 232. The first data pin 231 and the second data pin 232 are short-circuited by using a short-circuit resistor in the charging protocol chip 130, and the charging protocol chip 210 detects whether a voltage of the second data pin 232 reaches VDP_SRC. The charging protocol chip 210 compares the voltage of the second data pin 232 with VDAT_REF (for example, 0.25~0.4 v) in a voltage comparator (not shown in FIG. 8, and for a setting manner, refer to FIG. 5 and FIG. 6) of the second data pin 232. If the voltage of the second data pin 232 is greater than VDAT_REF, it can be determined that the to-be-charged terminal 201 is connected to a charging interface, and then secondary detection is performed to determine whether the to-be-charged terminal 201 is connected to a DCP interface or a CDP interface.

Then, the charging protocol chip 210 enables a voltage source VDM_SRC on the second data pin 232 (not shown in FIG. 8, and for a setting manner, refer to FIG. 5 and FIG. 6), enables a current source IDP_SINK (not shown in FIG. 8, and for a setting manner, refer to FIG. 5 and a FIG. 6), and then compares a voltage of the first data pin 231 with a voltage of VDAT_REF. Because the first data pin 231 and the second data pin 232 are short-circuited by using the short-circuit resistor in the charging protocol chip 130, a voltage of the voltage source VDM_SRC makes VDAT_REF<DP<VDM_SRC. Therefore, when the charging protocol chip 210 detects that VDAT_REF<the voltage of the DP pin, it can be determined that the to-be-charged terminal 201 is connected to the DCP interface.

In addition, the charging protocol chip 130 continuously detects a related signal level, disconnects a short circuit between the first data pin 141 and the second data pin 142 after specific time, and determines, based on a specified condition, whether to enter a fast charging mode (for example, SCP fast charging). If the charging protocol chip 130 determines to enter the fast charging mode, the charging protocol chip 130 communicates with the charging protocol chip 230 to adjust a voltage, to determine a charging voltage and current that are required by the to-be-charged terminal 201.

It should be understood that a handshake circuit, a data detection circuit, and a DCP detection circuit that are used in the foregoing identification process are merely examples. This embodiment of this application is not limited thereto, provided that a corresponding detection requirement of the BC1.2 protocol and/or a corresponding detection requirement of the SCP protocol can be implemented.

Figure 9:
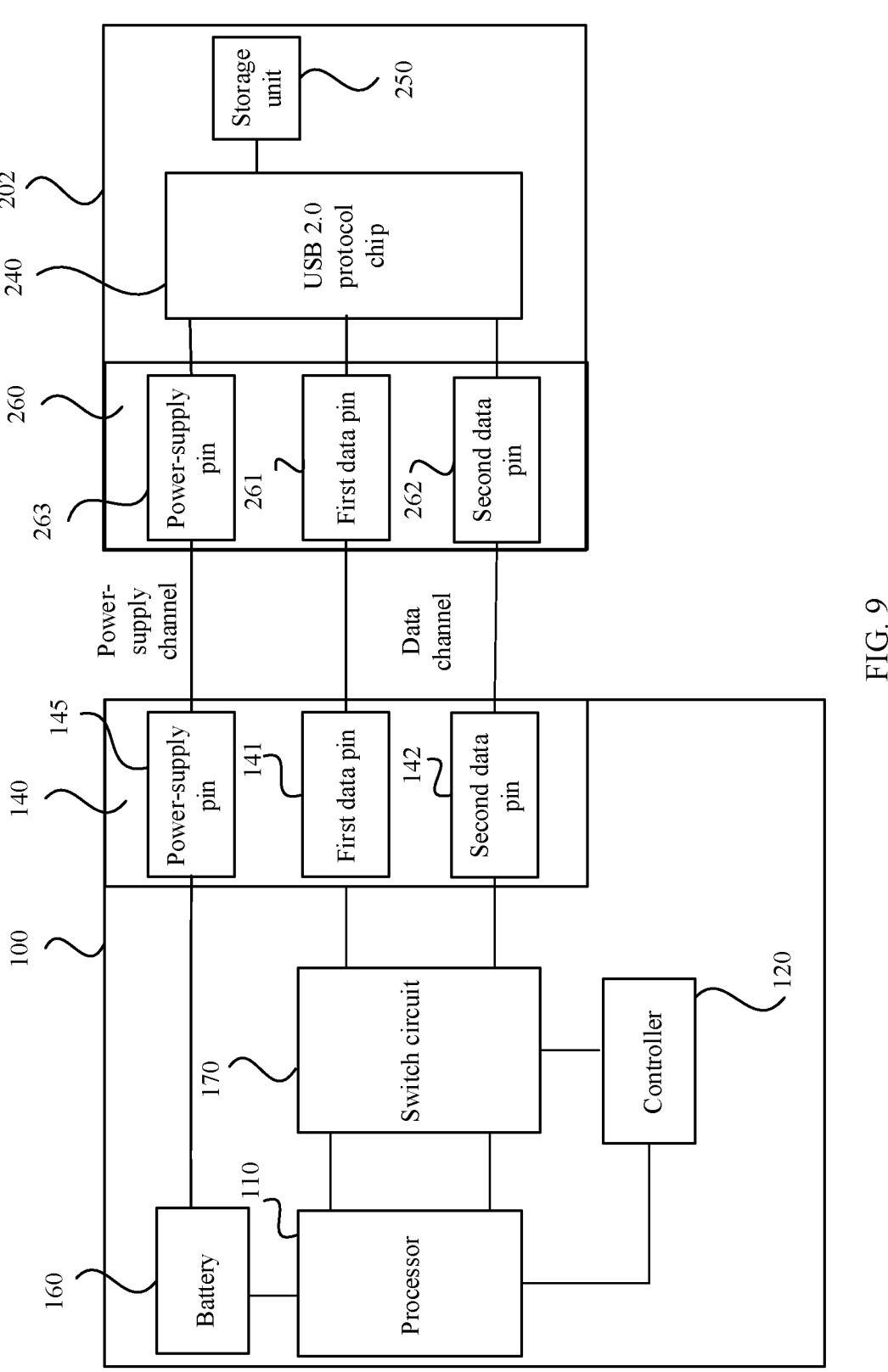
FIG. 9 is an example schematic diagram of a connection between an electronic device and a USB 2.0 device according to an embodiment of this application.

FIG. 9 is an example schematic diagram of a connection between an electronic device and a USB 2.0 device according to an embodiment of this application. Referring to FIG. 9, the external interface 140 includes a first data pin 141, a second data pin 142, and a power-supply pin 145. A USB 2.0 device 202 includes a USB 2.0 protocol chip 240, a storage unit 250, and a USB interface 260. The USB interface 260 includes a first data pin 261, a second data pin 262, and a power-supply pin 263. Based on a USB 2.0 protocol, the first data pin 261 or the second data pin 262 of the USB 2.0 device 202 is connected to, for example, a pull-up resistor of 1.5K ohms, based on different levels of transmission rates. For a process of identifying the USB 2.0 device 202, refer to the foregoing description provided with reference to FIG. 3. Details are not described herein again.

After the USB 2.0 device 202 accesses the electronic device 100, that is, after the USB interface 260 of the USB 2.0 device 202 is connected to the external interface 140 of the electronic device 100, charging protocol detection is first performed, as shown in the foregoing content. Details are not described herein again. If the charging protocol detection fails, the controller 120 controls the switch circuit 170 to enable a protocol channel between the processor 110 and the first data pin 141 and the second data pin 142. As a Host (host device), the processor 110 can identify the USB 2.0 device and a speed type of the USB 2.0 device through a change in levels of the first data pin 141 and the second data pin 142 as long as detecting a pull-up resistor of the USB 2.0 device. This identification process has no insertion time limitation.

It should be noted that when an external device is a USB 2.0 device, because the electronic device 100 first performs fast charging protocol detection, identification of the USB 2.0 device is delayed. However, it is difficult for a user to perceive the delay, and therefore user experience is not degraded.

It should be understood that types of the external interface 140, the charging interface 230, and the USB interface 260 are not limited in this embodiment of this application, and may include, for example, a Type C USB interface, a TypeA USB interface, and the like.

The following describes locations that are of the pins when the external interface 140, the charging interface 230, and the USB interface 260 are Type C USB interfaces. The following example constitutes no limitation on this application.

Figure 10:
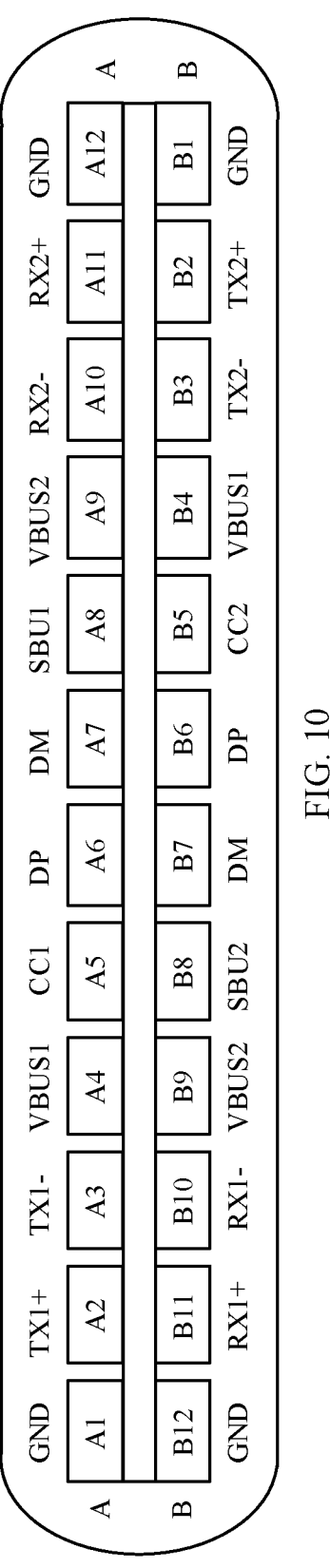
FIG. 10 is a schematic diagram of a structure of an external interface according to an embodiment of this application.

Referring to FIG. 10, when the external interface 140 is a Type C USB interface, the external interface 140 includes a side A and a side B. The side A includes a VBUS1 pin (a pin A4) and a VBUS2 pin (a pin A9). The side B includes a VBUS2 pin (a pin B9) and a VBUS1 pin (a pin B4). The VBUS1 pin (the pin A4) on the side A is electrically connected to the VBUS1 pin (the pin B4) on the side B, and the VBUS2 pin (the pin A9) on the side A is electrically connected to the VBUS2 pin (the pin B9) on the side B. The VBUS1 pin (the pin A4) on the side A and the VBUS1 pin (the pin B4) on the side B are first power-supply pins and can be used as the power-supply pins 145, 235, and 263. The VBUS2 pin (the pin A9) on the side A and the VBUS2 pin (the pin B9) on the side B are second power pins and can be used as the power-supply pins 145, 235, and 263. In this embodiment of this application, for the USB 2.0 protocol or the SCP protocol, DP pins (a pin A6 on the side A and a pin B6 on the side B) are the first data pins 111, 131, 141, 231, and 261, and DM pins (a pin A7 on the side A and a pin B7 on the side B) are the second data pins 112, 132, 142, 232, and 262. A CC1 pin (a pin A5 on the side A) is the first communication pins 143 and 263, and a CC2 pin (a pin B5 on the side B) is the second communication pins 144 and 264. The external interface 140 shown in FIG. 10 can implement flexible forward/reverse insertion of a power-supply cable. Regardless of an insertion direction, an external device 200 can be connected, and a power-supply channel, a protocol channel/data channel, and a handshake channel can be accurately matched without additional setting of a forward/reverse insertion software/hardware detection mechanism for assistance.

It should be understood that the external interface in FIG. 10 is merely an example. In another embodiment of this application, the external interface 140 may be another type of interface, for example, a type A USB interface, or a Type C USB interface that includes pins fewer than those shown in FIG. 10, such as a Type C USB interface that does not include pins TX1+, TX1−, RX2+, RX2−, and the like in FIG. 10.

The following describes in detail a structure and a working principle of the switch circuit of the electronic device 100.

Figure 11:
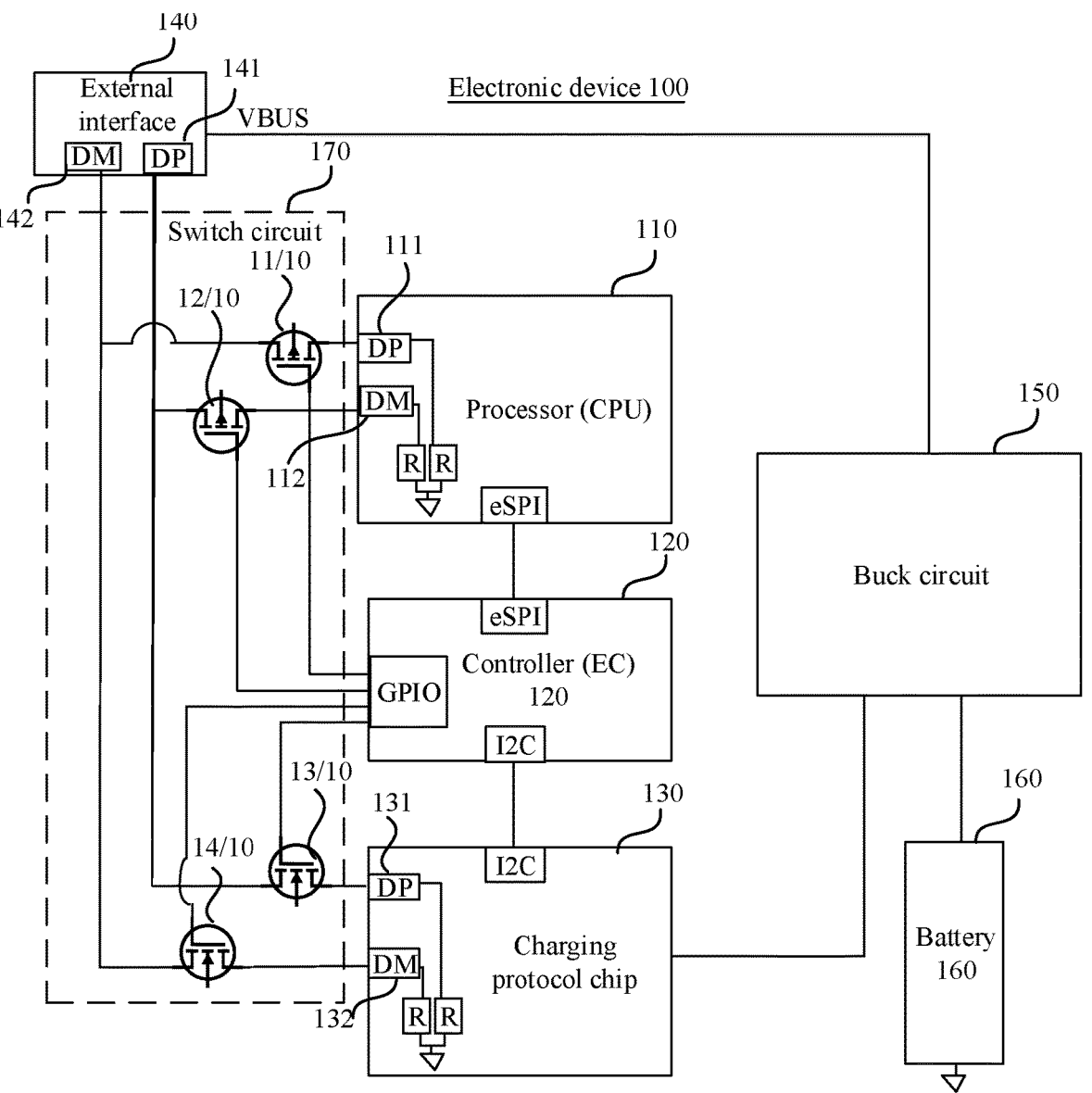
FIG. 11 is an example schematic diagram of a switch circuit of an electronic device according to an embodiment of this application.

FIG. 11 is an example schematic diagram of a switch circuit of an electronic device according to an embodiment of this application. Referring to FIG. 11, the switch circuit 170 includes four switch components 10. For example, the switch component 10 includes a first switch transistor 11, a second switch transistor 12, a third switch transistor 13, and a fourth switch transistor 14. The first switch transistor 11, the second switch transistor 12, the third switch transistor 13, and the fourth switch transistor 14 each include a first terminal, a second terminal, and a control terminal. The controller 120 includes a general-purpose input/output (GPIO) interface, and the general-purpose input/output (GPIO) interface of the controller 120 includes a first control pin, a second control pin, a third control pin, and a fourth control pin. The first terminal of the first switch transistor 11 is connected to the first data pin 141 of the external interface 140, the second terminal is connected to the first data pin 111 of the processor 110, and the control terminal is connected to the first control pin of the general-purpose input/output (GPIO) interface of the controller 120. The first terminal of the second switch transistor 12 is connected to the second data pin 142 of the external interface 140, the second terminal is connected to the second data pin 112 of the processor 110, and the control terminal is connected to the second control pin of the general-purpose input/output (GPIO) interface of the controller 120. The first terminal of the third switch transistor 13 is connected to the first data pin 141 of the external interface 140, the second terminal is connected to the first data pin 131 of the charging protocol chip 130, and the control terminal is connected to the third control pin of the general-purpose input/output (GPIO) interface of the controller 120. The first terminal of the fourth switch transistor 14 is connected to the second data pin 142 of the USB interface 140, the second terminal is connected to the second data pin 132 of the charging protocol chip 130, and the control terminal is connected to the fourth control pin of the general-purpose input/output (GPIO) interface of the controller 120. The controller 120 outputs a level signal or a control signal to the control terminals of the first switch transistor 11, the second switch transistor 12, the third switch transistor 13, and the fourth switch transistor 14 by using the first control pin, the second control pin, the third control pin, and the fourth control pin of the GPIO interface, to control on or off of the first switch transistor 11, the second switch transistor 12, the third switch transistor 13, and the fourth switch transistor 14.

When no external device accesses the external interface 140, under action of the level signal or the control signal output by the controller 120, the third switch transistor 13 and the fourth switch transistor 14 are turned on, and the first switch transistor 11 and the second switch transistor 12 are turned off, so that the second protocol identification channel is conducted and the first protocol identification channel is disconnected. After an external device accesses the external interface 140, the charging protocol chip 130 communicates with the external device through the second protocol identification channel to perform charging protocol identification, to determine whether the external device supports a corresponding charging protocol (for example, the SCP protocol). For details, refer to the foregoing content. If the charging protocol identification succeeds, the charging protocol chip 130 sends, to the controller 120, an indication indicating that the charging protocol identification succeeds. The controller 120 determines, based on a current status of the battery 160, for example, remaining power and a current output voltage, whether to enable fast charging to charge the external device. For example, when the remaining power of the battery is greater than a specified threshold (for example, 30%), the controller 120 determines to enable fast charging. After the controller 120 determines to enable fast charging to charge the external device, the charging protocol chip 130 sends an enable signal to the voltage conversion circuit 150, and the voltage conversion circuit 150 performs fast charging on the external device through the external interface 140 based on a charging voltage and current that are determined by the charging protocol chip 130.

If the charging protocol identification fails, the charging protocol chip 130 sends, to the controller 120, an indication indicating that the charging protocol identification fails. The controller 120 changes, based on the indication, level signals or control signals output by the first control pin, the second control pin, the third control pin, and the fourth control pin of the GPIO interface, so that the third switch transistor 13 and the fourth switch transistor 14 are turned off, and the first switch transistor 11 and the second switch transistor 12 are turned on. Therefore, the second protocol identification channel is disconnected, and the first protocol identification channel is conducted. Then, the processor 110 communicates with the external device through the first protocol identification channel to perform USB 2.0 protocol identification, to determine whether the external device is a USB 2.0 device (for a USB 2.0 identification process, refer to the foregoing description). After it is determined that the external device is a USB 2.0 device, a subsequent operation such as data reading or storage is performed based on a device type. For example, when the USB 2.0 device is a high-speed storage device, high-speed data reading or storage is performed with the USB 2.0 device. When the USB 2.0 device is a low-speed storage device, low-speed data reading or storage is performed with the USB 2.0 device. After the external device is removed from the external interface 140, the processor 110 sends, to the controller 120 through, for example, an eSPI bus, an indication indicating that the USB 2.0 device is removed. Then, the controller 120 changes the level signals or the control signals output by the first control pin, the second control pin, the third control pin, and the fourth control pin of the GPIO interface, so that the third switch transistor 13 and the fourth switch transistor 14 are turned on, and the first switch transistor 11 and the second switch transistor 12 are turned off. Therefore, the second protocol identification channel is conducted, and the first protocol identification channel is disconnected, to wait for access of a next external device and repeat the foregoing identification process.

For example, the first switch transistor 11 and the second switch transistor 12 may be PMOS transistors, and the third switch transistor 13 and the fourth switch transistor 14 may be NMOS transistors. The controller 120 is configured to pull up levels (that is, high levels are output) of the four pins of the GIPO that are connected to the control terminals of the switch transistors by default, so that the first switch transistor 11 and the second switch transistor 12 are turned off, and the third switch transistor 13 and the fourth switch transistor 14 are turned on. Therefore, the first protocol identification channel is disconnected, and the second protocol identification channel is conducted. After the charging protocol identification fails, the controller 120 pulls down the levels (that is, low levels are output) of the first control pin, the second control pin, the third control pin, and the fourth control pin of the GIPO interface, so that the first switch transistor 11 and the second switch transistor 12 are turned on, and the third switch transistor 13 and the fourth switch transistor 14 are turned off. Therefore, the first protocol identification channel is conducted, and the second protocol identification channel is disconnected. After the external device is removed, the controller 120 pulls up again the levels (that is, high levels are output) of the first control pin, the second control pin, the third control pin, and the fourth control pin of the GIPO interface, so that the second protocol identification channel is conducted by default, and the first protocol identification channel is disconnected by default.

It should be understood that, although in the embodiment shown in FIG. 11, the GPIO interface of the controller 120 controls the first switch transistor to the fourth switch transistor by using four control pins, in another embodiment, only one control pin may be used to control the first switch transistor to the fourth switch transistor, or two control pins may be used to control the first switch transistor to the fourth switch transistor.

When one control pin is used, the control terminals of the first switch transistor to the fourth switch transistor all are connected to the control pin, and a level output by the control pin is used to turn on the first switch transistor and the second switch transistor and turn off the third switch transistor and the fourth switch transistor, or turn on the third switch transistor and the fourth switch transistor and turn off the first switch transistor and the second switch transistor. In this case, the first switch transistor and the second switch transistor are of a same type, the third switch transistor and the fourth switch transistor are of a same type, and the first switch transistor and the third switch transistor are opposite in type. For example, the example first switch transistor 11 and second switch transistor 12 may be PMOS transistors, and the third switch transistor 13 and the fourth switch transistor 14 may be NMOS transistors. Alternatively, the first switch transistor 11 and the second switch transistor 12 may be NMOS transistors, and the third switch transistor 13 and the fourth switch transistor 14 may be PMOS transistors. In this way, only one control pin needs to be used to control the four switch transistors, so that a quantity of occupied pins of the GPIO interface of the controller is decreased, and a control signal is relatively simple.

When two control pins are used, the control terminals of the first switch transistor and the second switch transistor are connected to the first control pin, the control terminals of the third switch transistor and the fourth switch transistor are connected to the second control pin, and levels output by the first control pin and the second control pin are used to turn on the first switch transistor and the second switch transistor and turn off the third switch transistor and the fourth switch transistor, or turn on the third switch transistor and the fourth switch transistor and turn off the first switch transistor and the second switch transistor. In this case, it is only required that the first switch transistor and the second switch transistor are of a same type, and the third switch transistor and the fourth switch transistor are of a same type, and the first switch transistor and the third switch transistor do not need to be opposite in type. For example, the first switch transistor 11 and the second switch transistor 12 may be PMOS transistors, and the third switch transistor 13 and the fourth switch transistor 14 may be PMOS transistors. Alternatively, the first switch transistor 11 and the second switch transistor 12 may be NMOS transistors, and the third switch transistor 13 and the fourth switch transistor 14 may be NMOS transistors. Alternatively, the first switch transistor 11 and the second switch transistor 12 may be PMOS transistors, and the third switch transistor 13 and the fourth switch transistor 14 may be NMOS transistors. Alternatively, the first switch transistor 11 and the second switch transistor 12 may be NMOS transistors, and the third switch transistor 13 and the fourth switch transistor 14 may be PMOS transistors. In this case, the foregoing control effect can be implemented simply by adjusting, based on a type of the switch transistor, the level output by the control pin of the controller.

It should be further understood that, when four control pins are used, as shown in FIG. 11, types of the first switch transistor to the fourth switch transistor all may be P-types or N-types, and do not need to be the same.

Figure 12:
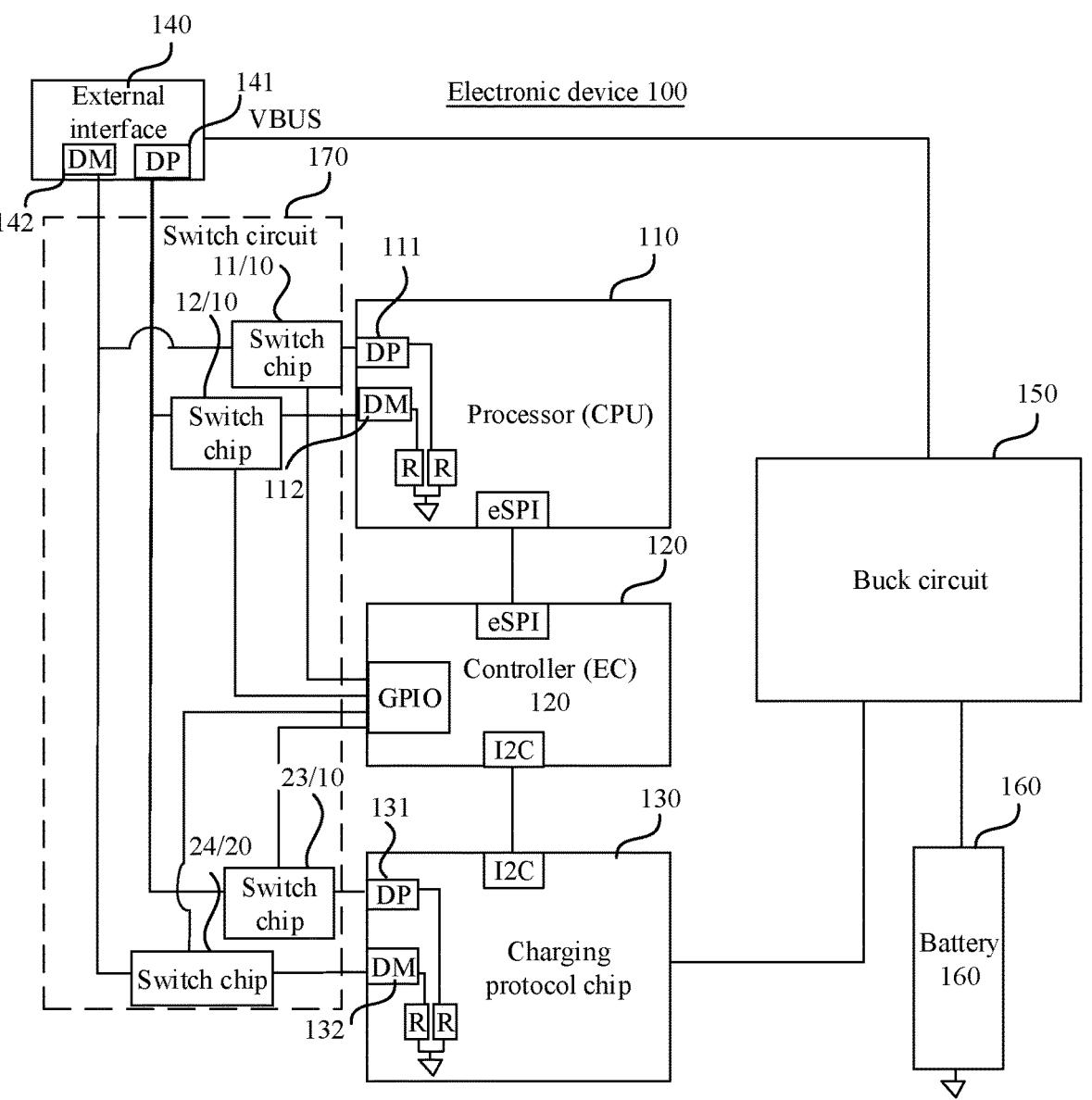
FIG. 12 is an example schematic diagram of another switch circuit of an electronic device according to an embodiment of this application.

FIG. 12 is an example schematic diagram of another switch circuit of an electronic device according to an embodiment of this application. Referring to FIG. 12, unlike FIG. 11, in the electronic device shown in FIG. 12, the switch circuit 170 includes four switch components 20. For example, the switch component 20 includes a first switch chip 21, a second switch chip 22, a third switch chip 23, and a fourth switch chip 24. The first switch chip 21, the second switch chip 22, the third switch chip 23, and the fourth switch chip 24 each include a first terminal, a second terminal, and a control terminal. The first terminal of the first switch chip 21 is connected to the first data pin 141 of the external interface 140, the second terminal is connected to the first data pin 111 of the processor 110, and the control terminal is connected to the first control pin of the general-purpose input/output (GPIO) interface of the controller 120. The first terminal of the second switch chip 22 is connected to the second data pin 142 of the external interface 140, the second terminal is connected to the second data pin 112 of the processor 110, and the control terminal is connected to the second control pin of the general-purpose input/output (GPIO) interface of the controller 120. The first terminal of the third switch chip 23 is connected to the first data pin 111 of the external interface 140, the second terminal is connected to the first data pin 131 of the charging protocol chip 130, and the control terminal is connected to the third control pin of the general-purpose input/output (GPIO) interface of the controller 120. The first terminal of the fourth switch chip 24 is connected to the second data pin 142 of the external interface 140, the second terminal is connected to the second data pin 132 of the charging protocol chip 130, and the control terminal is connected to the fourth control pin of the general-purpose input/output (GPIO) interface of the controller 120. The controller 120 outputs a level signal or a control signal to the control terminals of the first switch chip 21, the second switch chip 22, the third switch chip 23, and the fourth switch chip 24 by using the first control pin, the second control pin, the third control pin, and the fourth control pin of the GPIO interface, to control on and off of the first switch chip 21, the second switch chip 22, the third switch chip 23, and the fourth switch chip 24.

A working principle of the switch circuit of the electronic device shown in FIG. 12 is similar to a working principle of the switch circuit of the electronic device shown in FIG. 11. Details are not described herein again.

Figure 13:
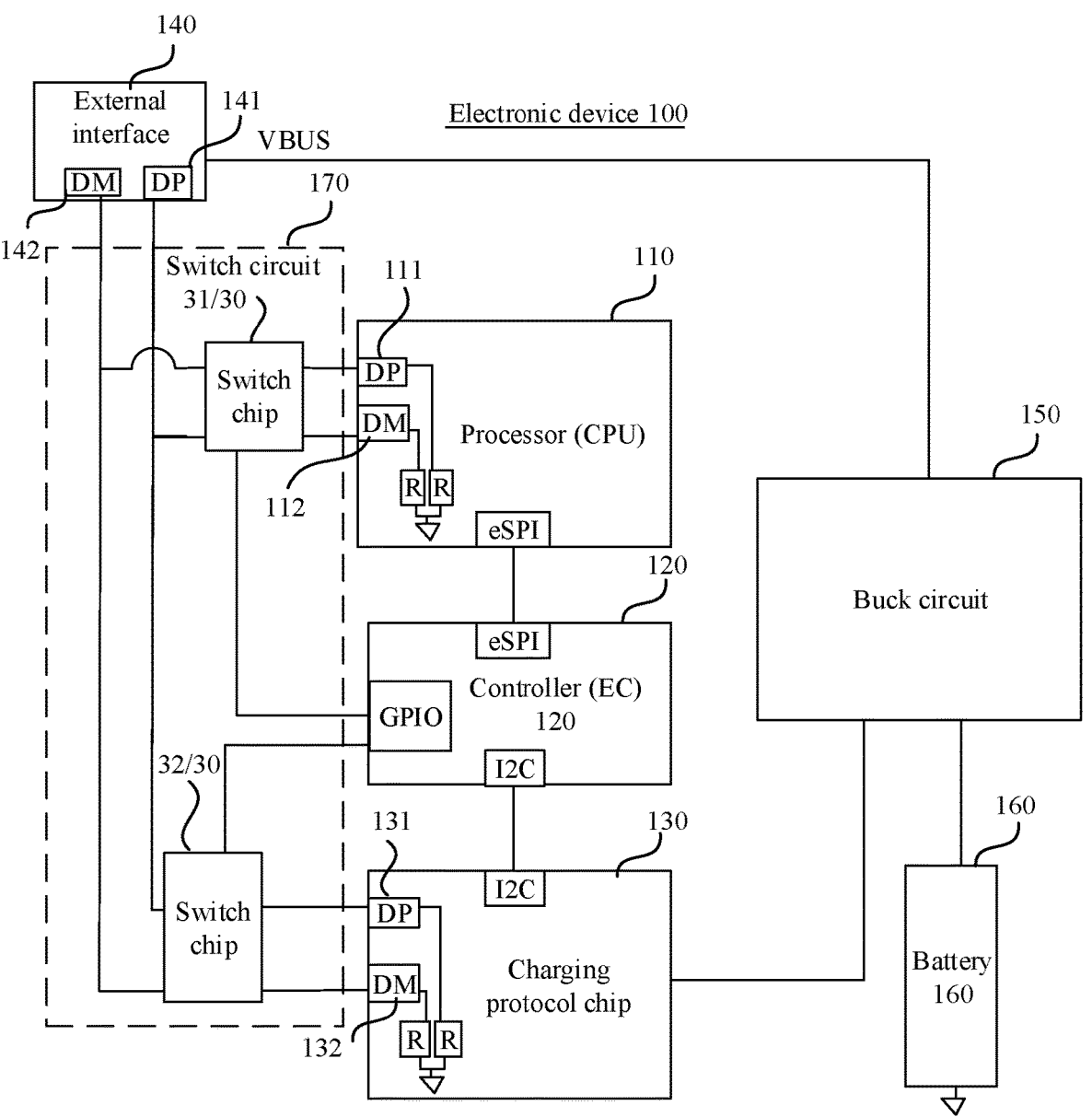
FIG. 13 is an example schematic diagram of still another switch circuit of an electronic device according to an embodiment of this application.

FIG. 13 is an example schematic diagram of still another switch circuit of an electronic device according to an embodiment of this application. Referring to FIG. 13, unlike FIG. 11, in the electronic device shown in FIG. 13, the switch circuit 170 includes two switch components 30. For example, the switch component 30 includes a first switch chip 31 and a second switch chip 32. Both the first switch chip 31 and the second switch chip 32 include two input terminals, two output terminals, and one control terminal. The two input terminals of the first switch chip 31 are respectively connected to the first data pin 141 and the second data pin 142 of the external interface 140, and the two output terminals are respectively connected to the first data pin 111 and the second data pin 112 of the processor 110, to form the first protocol identification channel. The two input terminals of the second switch chip 32 are respectively connected to the first data pin 141 and the second data pin 142 of the external interface 140, and the two output terminals are respectively connected to the first data pin 131 and the second data pin 132 of the charging protocol chip 130, to form the second protocol identification channel. The control terminals of each of the first switch chip 31 and the second switch chip 32 are respectively connected to the first control pin and the second control pin of the GPIO interface of the controller 120. The controller 120 applies a control signal to the control terminals of the first switch chip 31 and the second switch chip 32 to control on and off of the first switch chip 31 and the second switch chip 32, so as to control conduction or disconnection of the first protocol identification channel and the second protocol identification channel.

A working principle of the switch circuit of the electronic device shown in FIG. 13 is similar to a working principle of the switch circuit of the electronic device shown in FIG. 11. Details are not described herein again.

Figure 14:
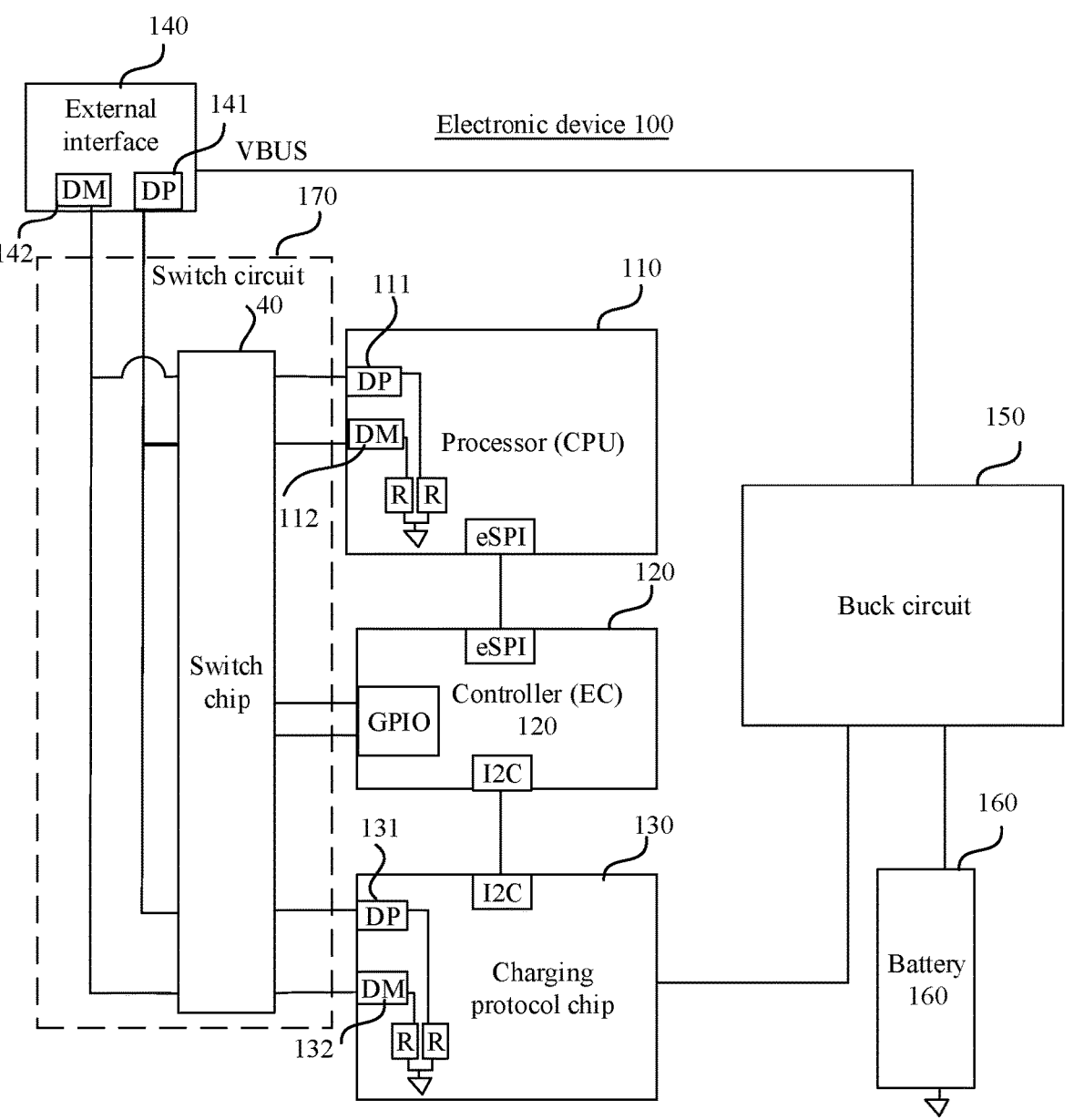
FIG. 14 is an example schematic diagram of still another switch circuit of an electronic device according to an embodiment of this application.

FIG. 14 is an example schematic diagram of still another switching circuit of an electronic device according to an embodiment of this application. Referring to FIG. 14, unlike FIG. 11, in the electronic device shown in FIG. 14, the switch circuit 170 includes one switch chip 40. The switch chip includes four input terminals, four output terminals, and two/four control terminals (two control terminals are shown in FIG. 14 as examples). The two input terminals of the switch chip 40 are respectively connected to the first data pin 141 and the second data pin 142 of the external interface 140, and the two output terminals are respectively connected to the first data pin 111 and the second data pin 112 of the processor 110, to form the first protocol identification channel. The other two input terminals of the switch chip 40 are respectively connected to the first data pin 141 and the second data pin 142 of the external interface 140, and the other two output terminals are respectively connected to the first data pin 131 and the second data pin 132 of the charging protocol chip 130, to form the second protocol identification channel. The two/four control terminals of the switch chip 40 are respectively connected to two/four control pins of the GPIO interface of the controller 120. The controller 120 applies a control signal to the control terminal of the switch chip 40 to control conduction or disconnection of the first protocol identification channel and the second protocol identification channel.

A working principle of the switch circuit of the electronic device shown in FIG. 14 is similar to a working principle of the switch circuit of the electronic device shown in FIG. 11. Details are not described herein again.

In conclusion, it can be learned that, in the electronic device provided in the embodiments of this application, the controller 120 and the switch circuit 170 are configured, so that the second protocol identification channel (that is, a charging protocol identification channel) is conducted by default. After an external device accesses the external interface 140, charging protocol identification is first performed. After the charging protocol identification fails, the controller 120 and the switch circuit 170 are used to disconnect the second protocol identification channel and conduct the first protocol identification channel, to perform USB 2.0 device identification. In addition, after a USB 2.0 device is removed from the USB interface 140, the controller 120 and the switch circuit 170 are used to conduct the second protocol identification channel by default again, to wait for access of a next external device. When the electronic device provided in the embodiments of this application is used, a terminal that supports the SCP protocol or the like can be quickly charged through the external interface without affecting identification of a USB 2.0 device.

An embodiment of this application further provides a device identification method. For example, the device identification method may be applied to the electronic device in the embodiments, and has a same beneficial effect. For detailed content that is not described in detail in this embodiment, refer to the foregoing embodiments of the electronic device. The following describes the device identification method with reference to the electronic devices shown in FIG. 8, FIG. 9, and FIG. 11.

As shown in FIG. 15, the device identification method may be implemented by using the following steps.

S1501: A controller controls a switch circuit to conduct a second protocol identification channel by default, and disconnect a first protocol identification channel by default.

For example, the controller 120 is configured to pull up levels (that is, high levels are output) of the first control pin, the second control pin, the third control pin, and the fourth control pin of the GIPO by default, so that the first switch transistor 11 (PMOS) and the second switch transistor 12 (PMOS) are turned off, and the third switch transistor 13 (NMOS) and the fourth switch transistor 14 (NMOS) are turned on. Therefore, the first protocol identification channel is disconnected, and the second protocol identification channel is conducted.

S1502: A charging protocol chip communicates with an external device to perform charging protocol detection, and feeds back a detection result to the controller.

For example, the charging protocol chip 130 completes a handshake with the to-be-charged terminal 201 through a handshake channel, and then provides a power-supply pin/power-supply channel with, for example, a Vbus voltage of 5 V. Then, after the to-be-charged terminal 201 identifies, based on a BC1.2 protocol (Battery Charging v1.2), that the electronic device 100 is a DCP (Dedicated Charging Port, dedicated charging port) device, the charging protocol chip 130 performs charging protocol detection, and feeds back a detection result to the controller 120. For example, the charging protocol chip 130 sends, to the controller 120 through an I2C bus, an indication indicating that the charging protocol detection succeeds or fails.

After the charging protocol chip 130 succeeds in the charging protocol detection, proceed to step S1503; or after the charging protocol chip 130 fails in the charging protocol detection, proceed to step S1505.

S1503: The controller determines, based on battery power, whether to enable fast charging.

For example, the controller 120 determines, based on current power of the battery 160, whether to enable fast charging. For example, when the current power of the battery 160 is greater than a specified threshold, the controller 120 determines to enable fast charging.

After the controller 120 determines to enable fast charging, proceed to step S1504; or after the controller 120 determines not to enable fast charging, proceed to step S1505.

S1504: The charging protocol chip communicates charging information with a terminal, and sends an enable signal to a voltage conversion circuit after communicating the charging information, to enable fast charging.

For example, the charging protocol chip 210 of the terminal determines a required charging voltage and current based on a current circuit of the battery 220, and then sends the charging voltage and current to the charging protocol chip 130. The charging protocol chip 130 sends an enable signal to the voltage conversion circuit 150, and the voltage conversion circuit 150 quickly charges the external device through the USB interface 140 based on the charging voltage and current that are determined by the charging protocol chip 130.

S1505: The controller controls the switch circuit to disconnect the second protocol channel and conduct the first protocol identification channel.

For example, the charging protocol chip 130 sends, to the controller 120, an indication indicating that the charging protocol identification fails or indicating not to enable fast charging. The controller 120 changes, based on the indication, level signals or control signals output by the first control pin, the second control pin, the third control pin, and the fourth control pin of the GPIO interface, so that the third switch transistor 13 and the fourth switch transistor 14 are turned off, and the first switch transistor 11 and the second switch transistor 12 are turned on. Therefore, the second protocol identification channel is disconnected, and the first protocol identification channel is conducted. Then, the processor 110 communicates with the external device through the first protocol identification channel to perform USB 2.0 protocol identification, to determine whether the external device is a USB 2.0 device. After it is determined that the external device is a USB 2.0 device, a subsequent operation such as data reading or storage is performed based on a device type.

S1506: A processor notifies the controller that the USB 2.0 device is removed.

For example, after the external device is removed from the external interface 140, the processor 110 sends, to the controller 120 through, for example, an eSPI bus, an indication indicating that the USB 2.0 device is removed.

Then, go back to step S1501. The controller 120 changes the level signals or the control signals output by the first control pin, the second control pin, the third control pin, and the fourth control pin of the GPIO interface, so that the third switch transistor 13 and the fourth switch transistor 14 are turned on, and the first switch transistor 11 and the second switch transistor 12 are turned off. Therefore, the second protocol identification channel is conducted, and the first protocol identification channel is disconnected.

It should be noted that, the foregoing example merely shows a procedure of the device identification method, but constitutes no limitation on this application. For example, the device identification method may not include step S1503, or steps S1502 and S1504 may be combined into one step.

It may be understood that to implement the foregoing functions, the electronic device includes corresponding hardware and/or software modules for performing the functions. The algorithm steps in the examples described with reference to the embodiments disclosed in this specification can be implemented in this application in a form of hardware or a combination of hardware and computer software. Whether a function is performed by hardware or by driving hardware by using computer software depends on particular applications and design constraints of the technical solutions. Persons skilled in the art may use different methods to implement the described functions with reference to embodiments for each particular application, but it should not be considered that the implementation goes beyond the scope of this application.

Figure 16:
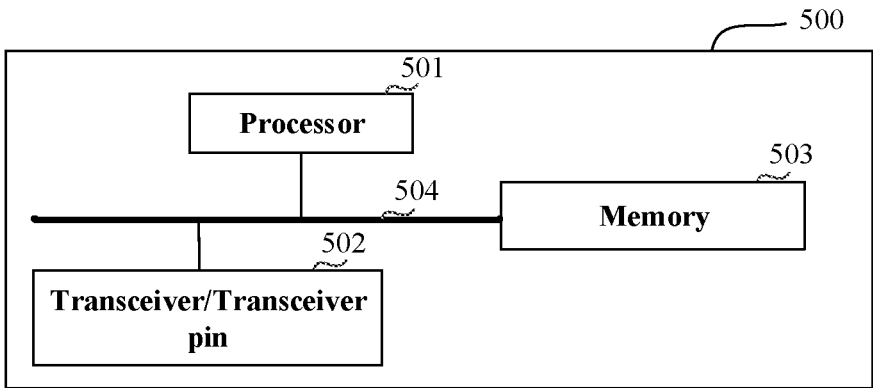
FIG. 16 is an example schematic block diagram of an apparatus according to an embodiment of this application.

In an example, FIG. 16 is a schematic block diagram of an apparatus 500 according to an embodiment of this application. The apparatus 500 may include a processor 501 and a transceiver/transceiver pin 502, and optionally, further includes a memory 503.

Components in the apparatus 500 are coupled together through a bus 504. In addition to a data bus, the bus 504 further includes a power bus, a control bus, and a status signal bus. However, for clarity of description, various buses are referred to as the bus 504 in the figure.

Optionally, the memory 503 may be configured to store the instructions in the foregoing method embodiments. The processor 501 may be configured to: execute the instructions in the memory 503, control a receive pin to receive a signal, and control a transmit pin to send a signal.

The apparatus 500 may be the electronic device or a chip in the electronic device in the foregoing method embodiments.

All related content of the steps in the foregoing method embodiments may be cited to function descriptions of corresponding functional modules. Details are not described herein.

In the device identification method provided in this embodiment of this application, steps performed by the electronic device 100 may also be performed by a chip system included in the electronic device 100. The chip system may include a processor and a Bluetooth chip. The chip system may be coupled to a memory, so that when the chip system runs, the chip system invokes a computer program stored in the memory to implement the steps performed by the electronic device 100. The processor in the chip system may be an application processor or may be a processor that is not an application processor.

The foregoing embodiments are merely intended to describe the technical solutions in this application, but not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof. However, these modifications or replacements do not make the essence of the corresponding technical solutions depart from the scope of the technical solutions in the embodiments of this application.

What is claimed is:

1. An electronic device, comprising a processor, a controller, a charging protocol chip, an external interface, and a switch circuit, wherein the processor, the charging protocol chip, and the external interface each comprise a data pin unit;

the data pin unit of the processor, the data pin unit of the charging protocol chip, the data pin unit of the external interface, and the controller are separately electrically connected to the switch circuit;

the controller is configured to control the switch circuit, so that the data pin unit of the external interface is connected to the data pin unit of the charging protocol chip and is disconnected from the data pin unit of the processor;

the charging protocol chip is configured to perform second protocol identification on an external device when the external interface is connected to the external device;

the controller is configured to control the switch circuit so that after receiving an indication that is sent by the charging protocol chip and that indicates that the second protocol identification fails, the data pin unit of the external interface is disconnected from the data pin unit of the charging protocol chip and is connected to the data pin unit of the processor; and the processor is configured to perform first protocol identification on the external device when the external interface is connected to the external device and the data pin unit of the processor is connected to the pin unit of the external interface.

2. The electronic device according to claim 1, wherein the controller is configured to: after receiving an indication that is sent by the processor and that indicates that the first protocol identification succeeds, continue to control the switch circuit, so that the data pin unit of the external interface is connected to the data pin unit of the processor and is disconnected from the data pin unit of the charging protocol chip; and control the switch circuit after receiving an indication that is sent by the processor and that indicates that the first protocol identification fails, so that the data pin unit of the external interface is disconnected from the data pin unit of the processor and is connected to the data pin unit of the charging protocol chip; and the controller is configured to: after receiving an indication that is sent by the charging protocol chip and that indicates that the second protocol identification succeeds, continue to control the switch circuit, so that the data pin unit of the external interface is connected to the data pin unit of the charging protocol chip and is disconnected from the data pin unit of the processor.

3. The electronic device according to claim 1, further comprising a voltage conversion circuit and a battery;

the external interface further comprises a power-supply pin;

the battery is electrically connected to the power-supply pin of the external interface by using the voltage conversion circuit; and the charging protocol chip is connected to the voltage conversion circuit, and is configured to send an enable signal to the voltage conversion circuit after the charging protocol chip succeeds in the protocol identification, so that the voltage conversion circuit provides a specified voltage to the power-supply pin of the external interface.

4. The electronic device according to claim 3, wherein the controller is further configured to: after receiving the indication that is sent by the charging protocol chip and that indicates that the second protocol identification succeeds, obtain power information of the battery, and send, to the charging protocol chip based on the power information of the battery, an indication indicating to enable fast charging or not to enable fast charging.

5. The electronic device according to claim 4, wherein when power of the battery is greater than a specified threshold, the controller sends an indication indicating to enable fast charging to the charging protocol chip; and when the power of the battery is less than or equal to the specified threshold, the controller sends an indication indicating not to enable fast charging to the charging protocol chip.

6. The electronic device according to claim 2, wherein when the external device is a device supporting a first protocol, and after the external device is removed from the external interface, the processor is further configured to send, to the controller after the external device is removed, an indication indicating that the external device is removed; and the controller controls the switch circuit based on the indication indicating that the external device is removed, so that the data pin unit of the external interface is disconnected from the data pin unit of the processor and is connected to the data pin unit of the charging protocol chip.

7. The electronic device according to claim 1, wherein the switch circuit comprises a switch chip, and the data pin unit of the processor, the data pin unit of the charging protocol chip, the data pin unit of the external interface, and the controller are separately electrically connected to the switch chip.

8. The electronic device according to claim 1, wherein the switch circuit comprises a first switch unit and a second switch unit;

the data pin unit of the processor, the data pin unit of the external interface, and the controller are separately electrically connected to the first switch unit, and the controller is configured to control the first switch unit, so that the data pin unit of the external interface is connected to or disconnected from the data pin unit of the processor; and the data pin unit of the charging protocol chip, the data pin unit of the external interface, and the controller are separately electrically connected to the second switch unit, and the controller is configured to control the second switch unit, so that the data pin unit of the external interface is connected to or disconnected from the data pin unit of the charging protocol chip.

9. The electronic device according to claim 8, wherein the first switch unit and the second switch unit each comprise a switch chip.

10. The electronic device according to claim 1, wherein the data pin unit comprises a first data pin and a second data pin;

the switch circuit comprises a first switch unit to a fourth switch unit;

the first data pin of the processor, the first data pin of the external interface, and the controller are separately electrically connected to the first switch unit, and the controller is configured to control the first switch unit, so that the first data pin of the external interface is connected to or disconnected from the first data pin of the processor, the second data pin of the processor, the second data pin of the external interface, and the controller are separately electrically connected to a second switch unit, and the controller is configured to control the second switch unit, so that the second data pin of the external interface is connected to or disconnected from the second data pin of the processor;

the first data pin of the charging protocol chip, the first data pin of the external interface, and the controller are separately electrically connected to a third switch unit, and the controller is configured to control the third switch unit, so that the first data pin of the external interface is connected to or disconnected from the first data pin of the charging protocol chip; and the second data pin of the charging protocol chip, the second data pin of the external interface, and the controller are separately electrically connected to the fourth switch unit, and the controller is configured to control the fourth switch unit, so that the second data pin of the external interface is connected to or disconnected from the second data pin of the charging protocol chip.

11. The electronic device according to claim 10, wherein the first switch unit to the fourth switch unit each comprise a switch chip or a MOS transistor.

12. The electronic device according to claim 11, wherein the first switch unit comprises a PMOS transistor, the second switch unit comprises a PMOS transistor, the third switch unit comprises an NMOS transistor, and the fourth switch unit comprises an NMOS transistor.

13. The electronic device according to claim 1, wherein the first protocol comprises a USB 2.0 protocol, and the second protocol comprises an SCP/FCP fast charging protocol.

14. The electronic device according to claim 1, wherein the data pin unit comprises a DP pin or a DM pin.

15. A device identification method, comprising:

controlling, by a controller of an electronic device that comprises a processor, the controller, a charging protocol chip, an external interface, and a switch circuit, the switch circuit, wherein the processor, the charging protocol chip, and the external interface each comprise a data pin unit, and wherein the data pin unit of the processor, the data pin unit of the charging protocol chip, the data pin unit of the external interface, and the controller are separately electrically connected to the switch circuit, wherein the controller controls the switch circuit so that the data pin unit of the external interface is connected to the data pin unit of the charging protocol chip and is disconnected from the data pin unit of the processor;

identifying, by the charging protocol chip, a type of an external device connected to the external interface;

after the charging protocol chip fails in the identification, controlling, by the controller, the switch circuit, so that the data pin unit of the external interface is disconnected from the data pin unit of the charging protocol chip and is connected to the data pin unit of the processor; and identifying, by the processor the type of the external device connected to the external interface.

16. The device identification method according to claim 15, wherein when the external device connected to the external interface is of a type corresponding to the processor, the method further comprises:

sending, by the processor to the controller after the external device is removed, an indication indicating that the external device is removed; and after receiving the indication indicating that the external device is removed, controlling, by the controller, the switch circuit, so that the data pin unit of the external interface is connected to the data pin unit of the charging protocol chip and is disconnected from the data pin unit of the processor.

17. A charging system, comprising the electronic device according to claim 1 and a terminal, wherein the terminal comprises a charging interface and a battery;

the charging interface is electrically connected to the external interface; and the electronic device charges the battery in the terminal through the external interface and the charging interface.

18. An electronic device, comprising a processor, a controller, a charging protocol chip, an external interface, and a switch circuit, wherein the processor, the charging protocol chip, and the external interface each comprise a data pin unit;

the data pin unit of the processor, the data pin unit of the charging protocol chip, the data pin unit of the external interface, and the controller are separately electrically connected to the switch circuit; and the controller is configured to control the switch circuit, so that the data pin unit of the external interface is connected to the data pin unit of the charging protocol chip and is disconnected from the data pin unit of the processor;

the charging protocol chip is configured to perform second protocol identification on an external device when the external interface is connected to the external device;

the controller is configured to control the switch circuit after receiving an indication that is sent by the charging protocol chip and that indicates that the second protocol identification fails, so that the data pin unit of the external interface is disconnected from the data pin unit of the charging protocol chip and is connected to the data pin unit of the processor;

the processor is configured to perform first protocol identification on the external device when the external interface is connected to the external device and the data pin unit of the processor is connected to the pin unit of the external interface; and the first protocol comprises a data transmission protocol, and the second protocol comprises a fast charging protocol.

19. The electronic device according to claim 18, wherein the controller is configured to: after receiving an indication that is sent by the processor and that indicates that the first protocol identification succeeds, continue to control the switch circuit, so that the data pin unit of the external interface is connected to the data pin unit of the processor and is disconnected from the data pin unit of the charging protocol chip; and control the switch circuit after receiving an indication that is sent by the processor and that indicates that the first protocol identification fails, so that the data pin unit of the external interface is disconnected from the data pin unit of the processor and is connected to the data pin unit of the charging protocol chip; and the controller is configured to: after receiving an indication that is sent by the charging protocol chip and that indicates that the second protocol identification succeeds, continue to control the switch circuit, so that the data pin unit of the external interface is connected to the data pin unit of the charging protocol chip and is disconnected from the data pin unit of the processor.

20. The electronic device according to claim 18, further comprising a voltage conversion circuit and a battery;

the external interface further comprises a power-supply pin;

the battery is electrically connected to the power-supply pin of the external interface by using the voltage conversion circuit; and the charging protocol chip is connected to the voltage conversion circuit, and is configured to send an enable signal to the voltage conversion circuit after the charging protocol chip succeeds in at least one of the first protocol identification or the second protocol identification, so that the voltage conversion circuit provides a specified voltage to the power-supply pin of the external interface.

* * * * *